US012603355B2

(12) United States Patent
Mo et al.

(10) Patent No.: US 12,603,355 B2
(45) Date of Patent: Apr. 14, 2026

(54) THERMAL RUNAWAY SHIELD

(71) Applicant: KULR TECHNOLOGY CORPORATION, Campbell, CA (US)

(72) Inventors: Michael Mo, Saratoga, CA (US); Yoshio Robert Yamaki, San Diego, CA (US); Juergen Mueller, San Diego, CA (US)

(73) Assignee: KULR TECHNOLOGY CORPORATION, Campbell, CA (US)

( * ) Notice: Subject to any disclaimer, the term of this patent is extended or adjusted under 35 U.S.C. 154(b) by 1650 days.

(21) Appl. No.: 16/870,795

(22) Filed: May 8, 2020

(65) Prior Publication Data

US 2020/0274212 A1     Aug. 27, 2020

Related U.S. Application Data

(63) Continuation-in-part of application No. 15/719,372, filed on Sep. 28, 2017, now Pat. No. 10,727,462.

(60) Provisional application No. 62/845,198, filed on May 8, 2019.

(51) Int. Cl.
| | |
|---|---|
| *H01M 10/658* | (2014.01) |
| *H01M 10/0525* | (2010.01) |
| *H01M 50/209* | (2021.01) |
| *H01M 50/213* | (2021.01) |
| *H01M 50/24* | (2021.01) |
| *H01M 50/291* | (2021.01) |
| *H01M 50/293* | (2021.01) |

(52) U.S. Cl.
CPC ..... *H01M 10/658* (2015.04); *H01M 10/0525* (2013.01); *H01M 50/209* (2021.01); *H01M 50/213* (2021.01); *H01M 50/24* (2021.01); *H01M 50/291* (2021.01); *H01M 50/293* (2021.01)

(58) Field of Classification Search
None
See application file for complete search history.

(56) References Cited

U.S. PATENT DOCUMENTS

| | | | |
|---|---|---|---|
| 2009/0004556 A1* | 1/2009 | Al-Hallaj | H01M 10/659 |
| | | | 429/120 |
| 2011/0159340 A1* | 6/2011 | Hu | H01M 10/617 |
| | | | 429/120 |
| 2018/0309107 A1* | 10/2018 | Widener | H01M 10/658 |

* cited by examiner

*Primary Examiner* — Maria Laios
(74) *Attorney, Agent, or Firm* — Greenberg Traurig LLP; Mammen "Roy" P. Zachariah

(57) ABSTRACT

A thermal runaway shield ("TRS") having at least one TRS module. The TRS module comprises a first wall, a second wall, and phenolic laminate inserts. The first wall has an exterior side and an interior side. The second wall has an exterior side and an interior side. The phenolic laminate inserts are disposed on the interior side of the first wall and on the interior side of the second wall. The first wall is coupled to the second wall forming an inner cavity. The at least one of the exterior side of the first wall and the exterior side of the second wall has a shape for conforming to a shape of at least one energy storage device cell.

23 Claims, 21 Drawing Sheets

Generate half shells for thermal runaway shield ("TRS") 80

Bond fibers to a polymer sheet to generate a wick sheet 82

Bond wick sheet to the generated half shells 84

Heat seal the two half sheets having an internal cavity with the fibers 86

Generate a hole into the internal cavity 88

Fill the internal cavity with an aqueous surfactant via the hole and seal the hole 90

Manufacture substrates 100

Flock fibers onto the manufactured substrates 102

Generate TRS modules from the flocked substrates 104

Introduce liquid into an inner cavity of the generated TRS modules 106

Embed a plug to an opening for each of the TRS modules 108

Prepare layers of TRS 170

Partially seal TRS to form envelope 172

Insert liquid in TRS 174

Seal TRS envelope 176

Section A-A

Section B-B

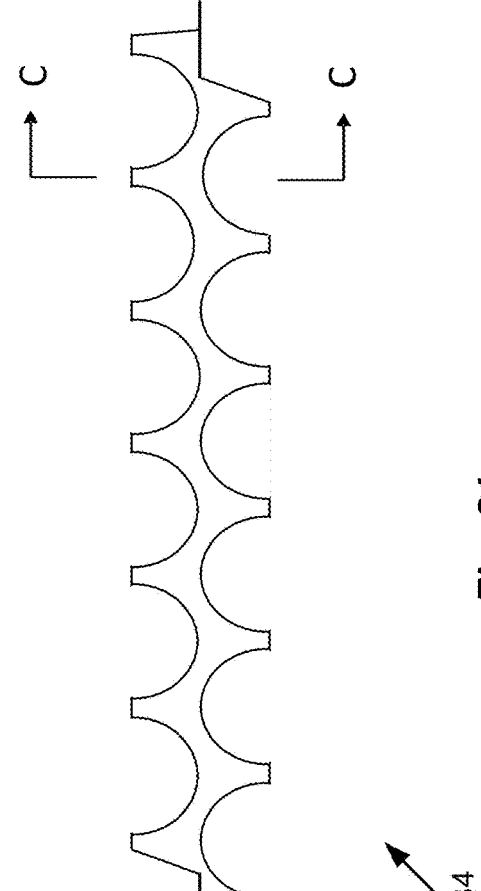
Fig. 21a
Fig. 21b
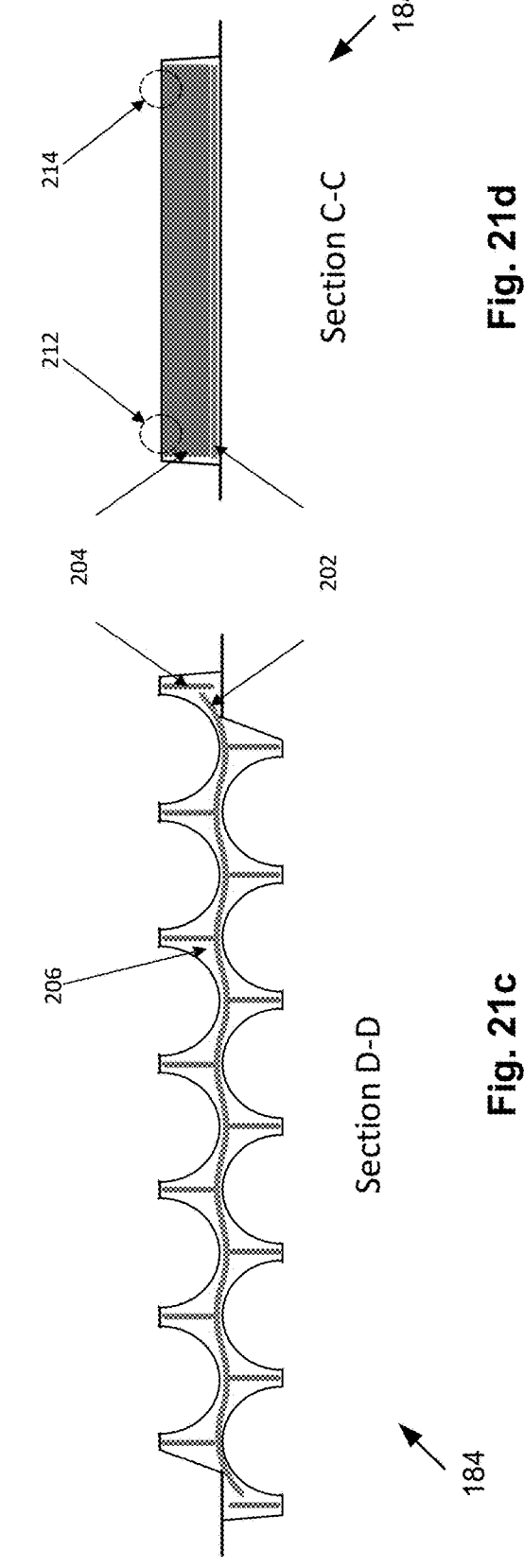
Section D-D
Fig. 21c
Section C-C
Fig. 21d

THERMAL RUNAWAY SHIELD

CROSS REFERENCE

This application is a continuation-in-part of application Ser. No. 15/719,372 filed Sep. 28, 2017 entitled "Thermal Runaway Shield," which claims priority from a provisional patent application entitled "Flexible Thermal Runaway Shield in Shell" filed on May 8, 2019, and having application No. 62/845,198. Said application and any other referenced application are incorporated herein by reference.

FIELD OF INVENTION

The present disclosure relates to thermal protection for an energy storage device and, in particular, to a thermal runaway shield for the energy storage device (e.g., a battery) to prevent thermal runaway propagation.

BACKGROUND

Lithium-Ion ("Li-Ion") 18650 cells (and other batteries) have a slight chance of spontaneously shorting, which heats the interior gradually until a separator film within the cell melts, resulting in an internal short. Consequently, an explosive release of thermal energy can be triggered. The explosion can cause an end cap of the shorted cell to rupture. A flare briefly emerges (e.g., of around 1 second) from that ruptured end cap. For a minute or so, the cell's materials combust, releasing heat and driving the shorted cell to about 500 degrees Celsius ("C") or greater.

If there are any neighboring cells that are consequently heated near or above a critical temperature (e.g., around 130° C.), the neighboring cells can also short with the same consequences causing additional explosions and ruptures; hence giving the well-known problem of thermal runaway propagation. The well-known Boeing battery problem is also of this nature. In Tesla's electric automobiles, the battery cells have an active cooling system to prevent such thermal runaway propagation.

However, there is a desire to seek a passive solution suitable for battery modules of arbitrary cell sizes and shapes. Therefore, there exists a need for a new system, method, and apparatus for preventing thermal runaway propagation for cells in an energy storage device.

DESCRIPTION OF THE DRAWINGS

The foregoing and other objects, aspects, and advantages of the present disclosure can be better understood from the following detailed description of various embodiments of the present disclosure when taken in conjunction with the accompanying drawings as follows.

FIGS. 21a-21d illustrates front and side views of the interstitial wall for the thermal runaway shield module and cross-sectional front and side views of the interstitial wall.

DETAILED DESCRIPTION OF THE EMBODIMENTS

Figure 1:
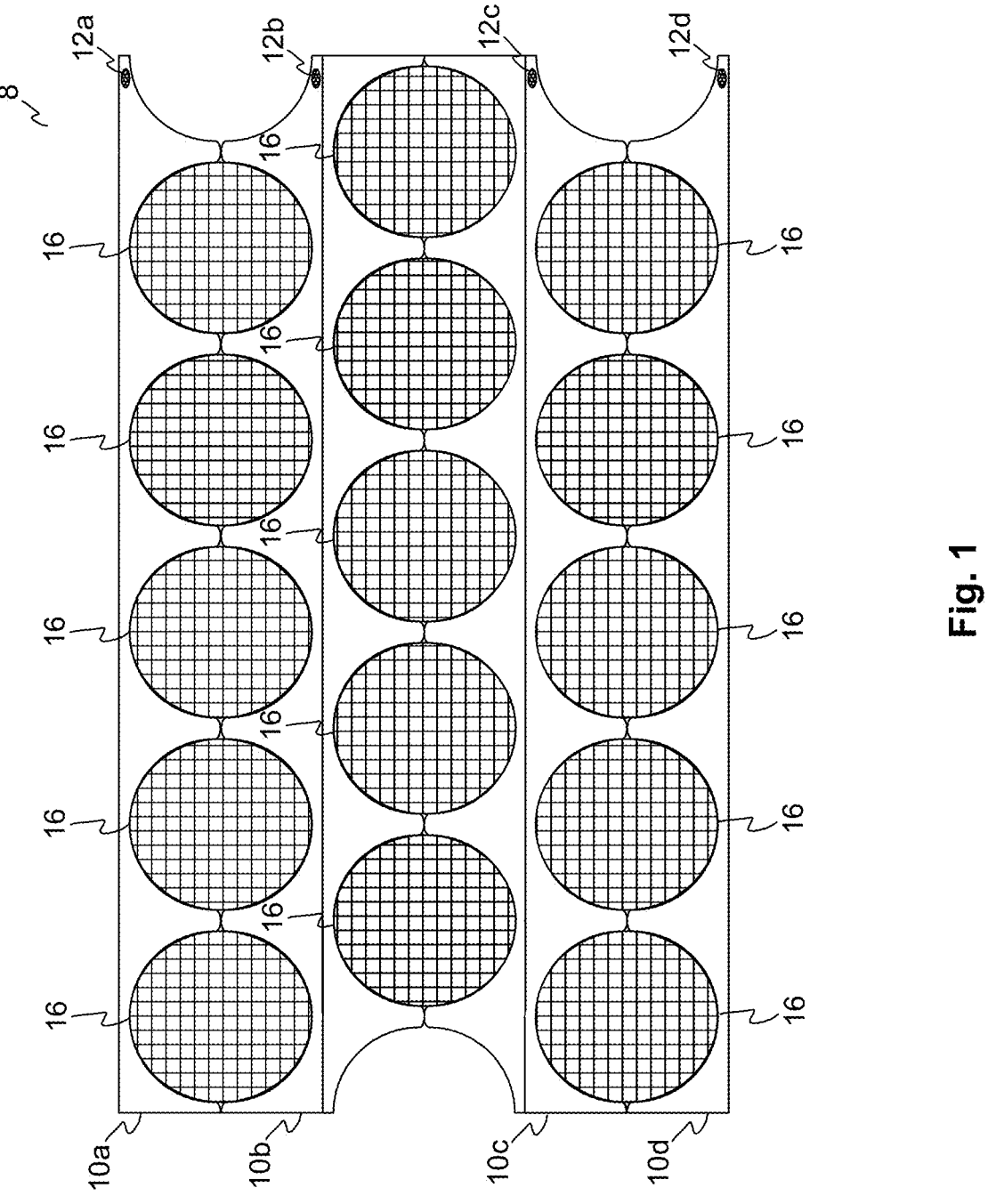
FIG. 1 illustrates a thermal runaway shield of the present disclosure.

In the following detailed description of the embodiments, reference is made to the accompanying drawings, which form a part hereof, and in which is shown by way of illustration of specific embodiments in which the present disclosure may be practiced. It is appreciated that the terms "a" or "an," as used herein, are defined as one or more than one. Also, unless stated otherwise, terms such as "first", "second", "third", etc. are used to distinguish between elements such terms describe. These terms are not necessarily intended to indicate temporal or prioritization of such elements.

In an embodiment of a thermal runaway shield ("TRS") module, the TRS module comprises the following: a first wall having an exterior side and an interior side; a second wall having an exterior side and an interior side; and fibers disposed on at least one of the interior sides of the first wall and the second wall. The first wall and the second wall are coupled together. An inner cavity can be located between the first wall and the second wall, where at least one of the exterior side of the first wall and the exterior side of the second wall has a shape for conforming to a shape of at least one energy storage device cell. Furthermore, the TRS module may further comprise a plug. At least one of the first wall and the second wall may have an opening through the wall. The plug can be disposed in the opening.

In a further embodiment, the TRS module can further comprise an aqueous solution or surfactant, where the aqueous solution or surfactant is disposed in the inner cavity. Also, the first wall and the second wall can comprise one or more rigid materials and/or one or more non-rigid materials. The fibers can be carbon fibers or other types of fibers, where the fibers can have uniform length, bimodal length, multimodal length, or nonuniform length.

In yet another embodiment, a thermal runaway shield can comprise at least one TRS module. The at least one TRS module comprises: a first wall having an exterior side and an interior side; a second wall having an exterior side and an interior side; and fibers disposed on the interior sides of the first wall and the second wall. The first wall and the second wall are coupled together to form an inner cavity between the first wall and the second wall. At least one of the exterior side of the first wall and the exterior side of the second wall has a shape for conforming to a shape of at least one energy storage device cell.

In another embodiment, a method for manufacturing a thermal runaway shield module, comprises the following steps: generating walls for the TRS; generating a wick sheet; bonding the generated wick sheet to at least one side of the walls; and coupling the walls together to form an inner cavity, where the bonded wick sheets are disposed in the inner cavity. In yet another embodiment, after the coupling step, an opening can be generated through at least one of the walls for allowing access between an exterior side of the TRS and the inner cavity. From there, an aqueous surfactant can be introduced into the inner cavity via the opening. A plug can be inserted into the opening.

Additional aspects, configurations, features, and embodiments of the present disclosure are described herein to aid in the understanding of the present disclosure. It is important to note that an aqueous surfactant can be an optional element of the TRS. For instance in an embodiment that uses flocked fibers for a wick, it may be advantageous to include an aqueous surfactant on the wick. Whereas in another embodiment that uses a veil wick, it may not be that advantageous to include an aqueous surfactant.

FIG. 1 illustrates a thermal runaway shield of the present disclosure. A thermal runaway shield 8 comprises TRS modules 10a-10d, where each of the TRS modules 10a-10d can be stacked to form hollow openings 16 for cylindrical, energy storage cells (e.g., Li-Ion 18650 cells or other battery cells) to be inserted in the hollow openings 16. The TRS modules 10a-10d each comprise plugs 12a-12d, which cover an opening through the exterior of the TRS to the interior of the respective TRS module 10a-10d. The plugs 12a-12d can be removed to allow gas and/or liquid from the internal cavities of the respective TRS modules 10a-10d to enter and/or exit the internal cavities of the TRS modules 10a-10d via the openings. When the plugs 12a-12d are removed, the openings can be used as an inlet for filling the inner cavity of a respective TRS module with an aqueous solution or surfactant.

The TRS 8 can run along the sides of the cylindrical, energy storage cells to dissipate heat generated from the energy storage cells. The TRS 8 can be used to stop thermal runaway propagation by thermally isolating each cell from another cell. If one of the cells shorts and subsequently flares, the heat from this reaction can be thermally isolated by the TRS 8 such that adjacent cells are thermally shielded from the flaring cell. It is understood that the form factor of the TRS can conform to the shape of the energy storage device ("ESD") cells. For instance, if the ESD cells are prismatic in shape, then the TRS can conform to such prismatic shape.

The form factor of the ESD cells disclosed herein are meant to be illustrative and are in no way meant to limit the present disclosure to those shapes. Furthermore, ESD cells can also be referred herein as cells, batteries, energy storage cells, or any other similar term.

Referring to FIG. 1, a side view of the TRS 8 is shown. It is understood that the TRS extends longitudinally (or lengthwise) to cover the cylindrical walls of any embedded energy storage device cells. For instance, the cylindrical, energy storage cells can be disposed in the hollow openings 16 such that an end cap is shown in the side view of the TRS 8. The hollow openings 16 can extend the length of the cylindrical, energy storage cells such that only the endcaps of the cylindrical, energy storage cells can be seen from an exterior, side view of the TRS 8.

Each of the TRS modules 10a-10d comprises walls, an inner cavity formed by the walls, and a plug for sealing an opening in a wall of the TRS module. The opening can allow for gas and/or liquid to be transferred to/from the interior cavity of the TRS module and the exterior of the TRS modules. When the plug is disposed in the opening, the inner cavity can be isolated from the exterior of the TRS module. The plug and the opening in the wall of a TRS module are optional features of the TRS module to allow for filling of the inner cavity of the TRS module and for expulsion of any gases from the inner cavity to the exterior of the TRS module. It can be appreciated that a TRS module of present disclosure includes other embodiments that do not have openings and/or plugs.

The walls of the inner cavity can be constructed using a polymer or other material to allow for thermal transfer between the ESD cells and the internal cavities of the thermal runaway shield (e.g., a metallic alloy or other thermally conductive material). The walls can be formed to be rigid, flexible, or combination of rigid and flexible. The amount of rigidity can be specified to fit a particular application or design of the TRS module. The walls are coupled together to form the inner cavity such that the inner cavity is substantially gas and liquid impermeable (unless such embodiment has a plug and opening through the wall to allow for such gas and/or liquid flow through the opening).

The inner cavity is enclosed by the walls of the respective TRS module. Fibers are disposed on the walls (or in a substrate that is further attached to the walls using an adhesive or other coupling means) of the inner cavity and can be wetted with a liquid to promote wicking.

The amount of liquid can be predefined based on the amount of energy needed to be dissipated. Heat transferred through the walls of the TRS modules can be dissipated and distributed by phase changes of the liquid on the fibers to a gaseous state. If the pressure of the gas reaches a threshold pressure value, the gas can escape via the opening of the walls by pushing the plug out of the opening to release some of the pressure. If the plug is released (or pushed out), additional liquid can be inserted to replenish the amount of aqueous solution or surfactant in the internal cavity. The plug can be inserted into the hole in the TRS module to reseal the internal cavity. Thus, heat from the energy storage cells can be safely isolated from other adjacent cells using the TRS modules.

In the internal cavities of the TRS modules, the fibers can be bimodal in length from the wall of the internal cavities or from the substrate on which the fibers are disposed. A first group of fibers are about a first length and a second group of fibers are about a second length. The second length can be longer than the first length. The first group of fibers can serve as a liquid storage for holding the liquid within the TRS modules and for converting the liquid within the cavity to a gaseous state when adequate heat energy is applied from the ESD cells.

If there is a breach in the walls of the thermal runaway shield module, liquid may escape through that breach. In such case, the first group of shorter fibers may be able to hold the liquid within the cavities more effectively than the second group of longer fibers. If the breached thermal runaway shield should need to convert more heat energy to a gaseous state, the shorter fibers can be provided additional liquid from the longer fibers through capillary action and/or gravity to aid in the subsequent conversions.

As noted, it is apparent to a person having ordinary skill in the art that the thermal modules 10a-10d can be designed for holding energy storage cells of various shapes. For instance, the hollow openings 14 illustrate cylindrical spaces to secure cylindrically shaped energy storage cells. However, other shapes can be used for the openings to secure other shaped cells as well, including cells having one of the following shapes, including a rectangular shape, a trapezoidal shape, an elliptical shape, another uniform shape, and a non-uniform shape.

In particular, thermal runaway propagation is especially important for 18650 Li-Ion cells. For instance, if one of the cells shorts, a chemical reaction within the cell can begin to start burning and flaring, which increases the surrounding temperature. This can cause a chain reaction in which nearby cells' temperatures increase to the point where their separator films melt, causing an internal short. The thermal runaway shield modules of the present disclosure can prevent or mitigate such thermal runaway propagation by limiting the heat transferred to the other cells from a shorted one that is flaring by using an internal cavity with fibers and liquid to convert that heat energy to lower the overall heat received by the other cells.

Figure 2A:
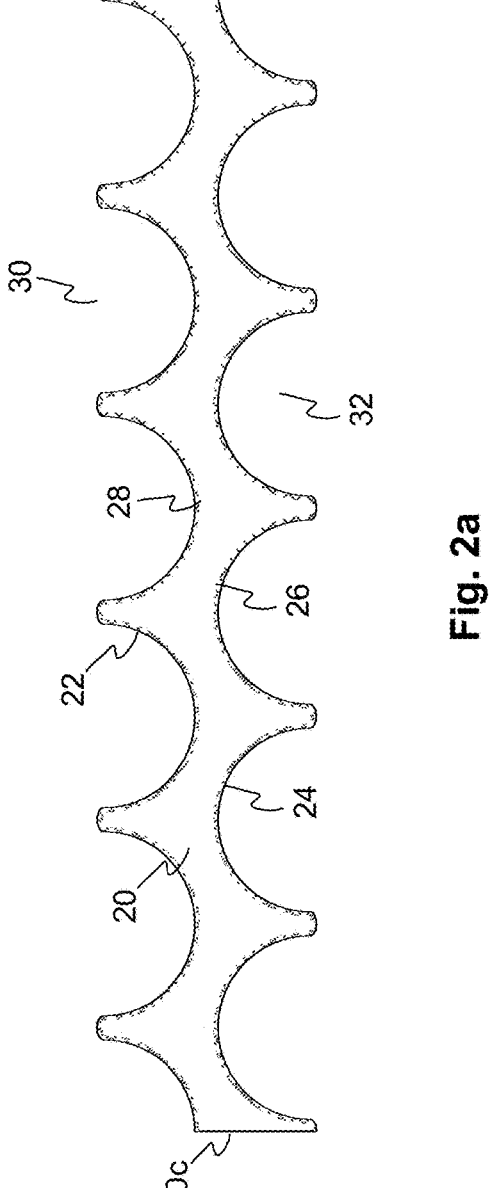
FIG. 2a illustrates a thermal runaway shield module of the present disclosure.

FIG. 2a illustrates a thermal runaway shield module of the present disclosure. A thermal runaway shield module 10c can be two sided in that it can form hollow openings on two sides of the thermal runaway shield module 10c when stacked in conjunction with other thermal runaway shield modules. In other examples, a thermal runaway shield module can also be one-sided (in that it only forms hollow openings on one of its sides, as illustrated by thermal runaway shield modules 10a and 10d in FIG. 1).

Referring to FIG. 2a, the TRS module 10c can have an exterior side 30 of the wall 22 to form a row of hollowing openings and an exterior side 32 of the wall 24 to form another row of hollow openings. The TRS module 10c can have an inner cavity 20 formed by the walls 22 and 24 of the TRS module 10c. An interior side of the wall 22 of the TRS module 10c can have fibers 28 disposed on the interior side of the wall 22 via a substrate or by other means, where the fibers face the inner cavity 20.

Likewise, an interior side of the wall 24 of the TRS module 10c can have fibers 26 disposed on the interior side of the wall 24 via a substrate or by other means, where the fibers face the inner cavity 20.

The fibers 26 and 28 can be of various materials, including carbon fibers, metallic fibers, textile fibers, etc. The fibers 26 and 28 can be wetted with an aqueous solution or surfactant such that when the shell heats up, the aqueous solution or surfactant is converted to a gaseous state. As noted, the fibers can also be arranged in a single-fiber-length configuration, a bimodal configuration, or another multimodal configuration (e.g., tri-modal configuration, quad-modal configuration, etc.). Alternatively, or in conjunction with the fibers 26 and 28, a veil can be used for wicking.

Figure 2B:
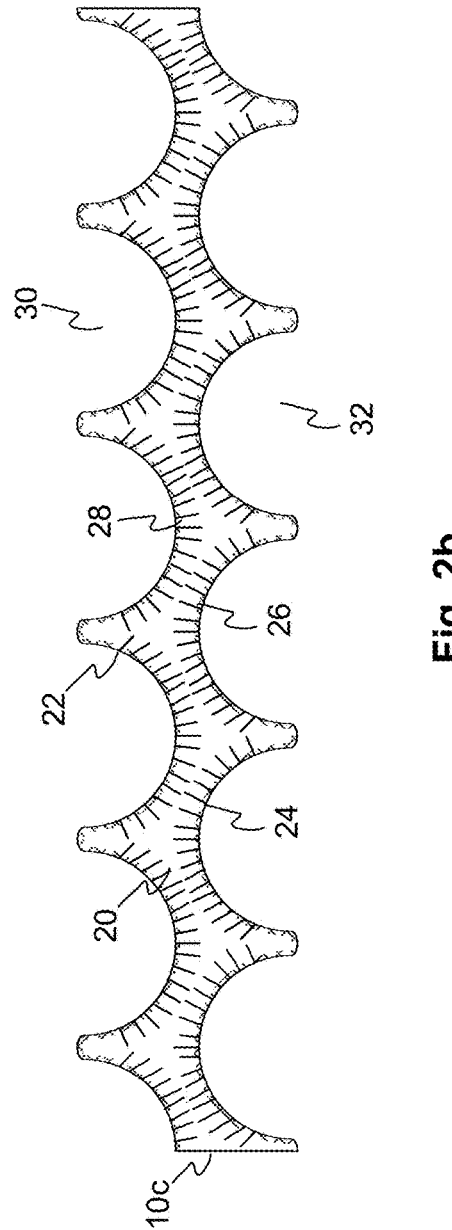
FIG. 2b illustrates a thermal runaway shield module of the present disclosure having bimodal fibers.

FIG. 2b illustrates a thermal runaway shield module of the present disclosure having bimodal fibers. The inner cavity 20 has bimodal fibers on the interior side of the walls 22 and 24. The carbon fibers can consist of a first group of carbon fibers and a second group of carbon fibers, where the length of the second group of carbon fibers can be anywhere from two or more times the length of the first group of carbon fibers. In accordance to an embodiment for bimodal fiber configurations, the longer fibers are fractionally longer than the shorter fiber, e.g., ~⅓ longer. Thus, the longer carbon fibers extend further within the inner cavity 20. The relative density between the first group of carbon fibers and the second group of carbon fibers can vary. In various embodiments, the shorter carbon fibers can be denser over a unit area than the longer carbon fibers (e.g., a packing density can be 10 percent for the shorter carbon fibers and 1 percent for the longer carbon fibers); or the shorter carbon fibers can be equal in density over a unit area than the longer carbon fibers; or the longer carbon fibers can be denser over a unit area than the shorter carbon fibers (e.g., packing density can be 10 percent for the longer carbon fibers and 1 percent for the shorter carbon fibers).

Figure 3:
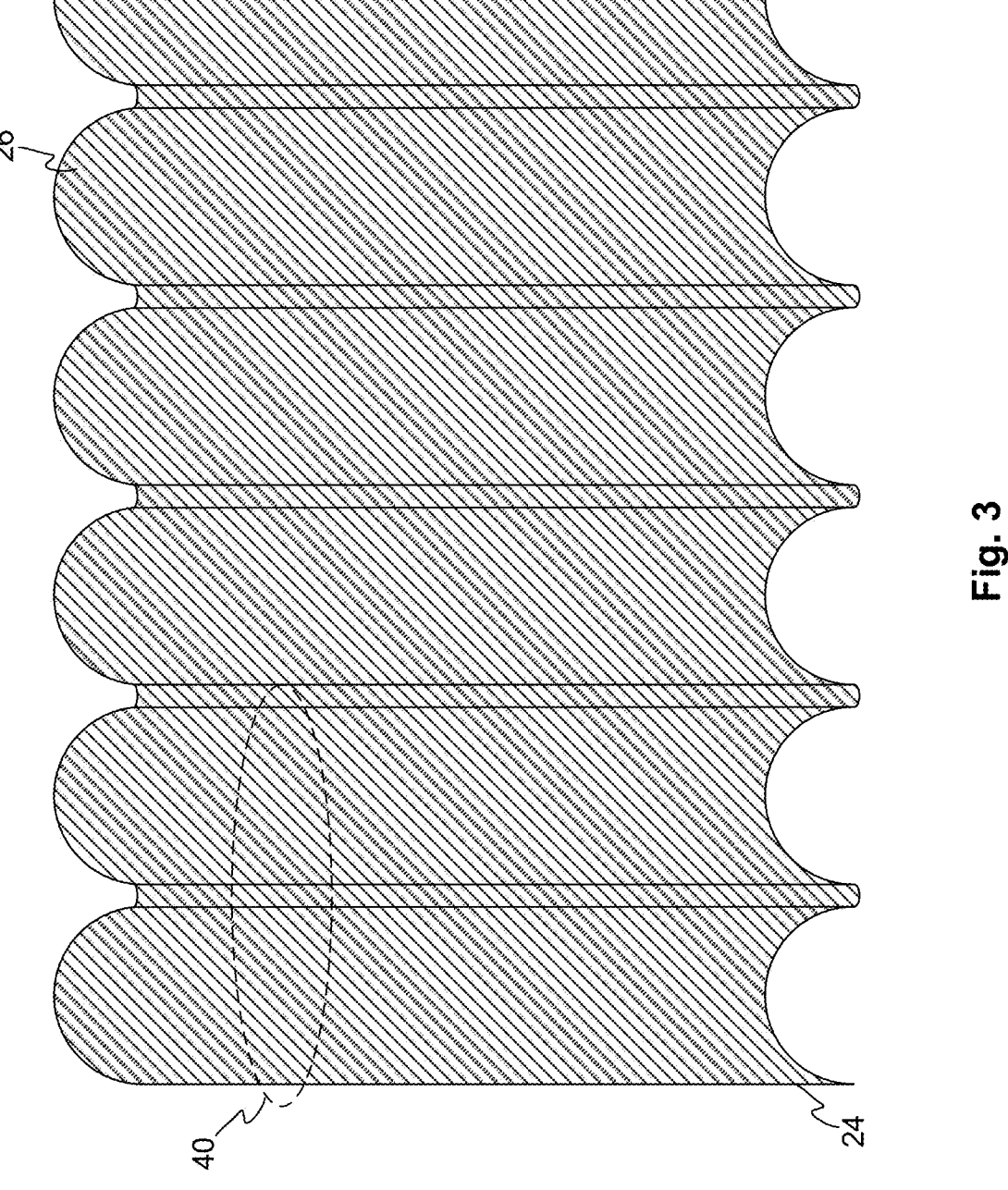
FIG. 3 illustrates an interior side of a wall of a thermal runaway shield module of the present disclosure.

FIG. 3 illustrates an interior side of a wall of a thermal runaway shield module of the present disclosure. In a top view of an internal cavity, fibers 26 can cover the interior side of the wall 24. The top view of the internal cavity shows that the fibers 26 can run along a length of the hollow opening on the interior side of the wall 24. A cross-sectional, zoomed-in view 40 of the internal cavity can illustrate more details of the fibers as depicted in FIG. 4a.

Figure 4A:
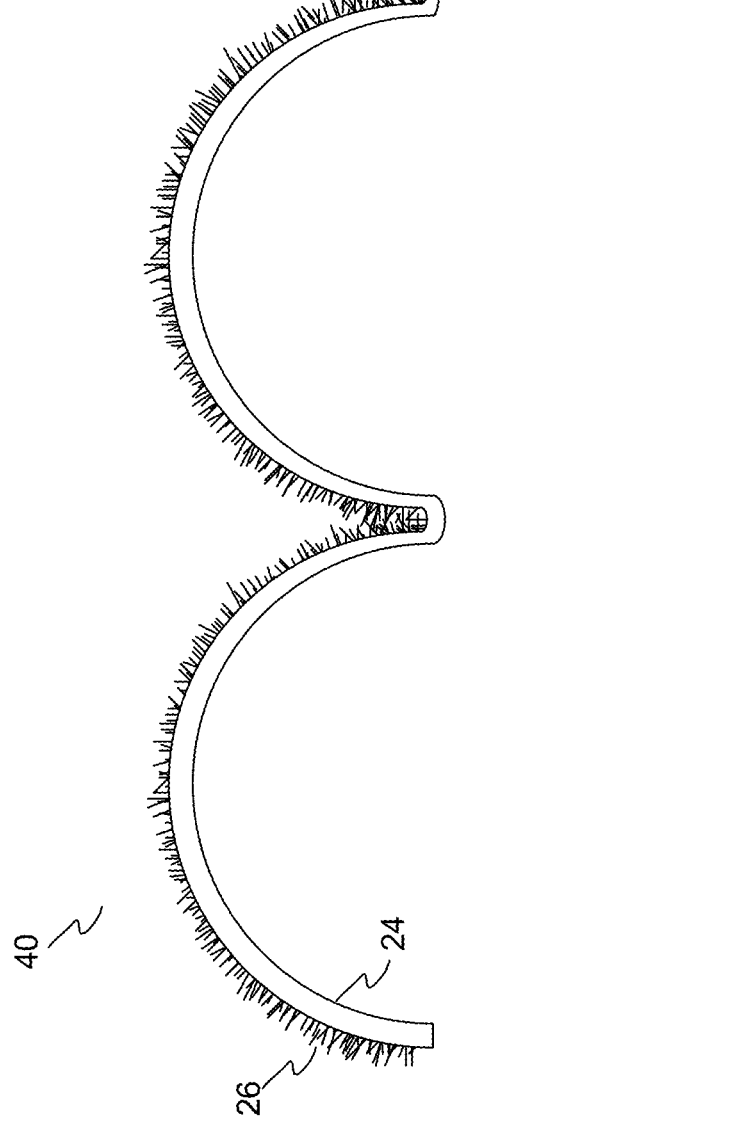
FIG. 4a illustrates a zoomed-in, cross-sectional view of a wall of a thermal runaway shield module of the present disclosure.

FIG. 4a illustrates a zoomed-in, cross-sectional view of an interior wall of an internal cavity of a thermal runaway shield module of the present disclosure. In the cross-sectional, zoomed-in view 40 of the internal cavity, fibers 26 are disposed on the wall 24 (or via a substrate that is adhered to the wall 24). The fibers 26 can be disposed substantially radially from the wall 24 and may occasionally intersect each other. The length, radius, and density of the fibers 26 can be determined based on the size of the inner cavity and based on thermodynamic concerns. In terms of length of the fibers, the fibers 26 can be multi-modal in that a first group of fibers can be about a first predefined length, a second group of fibers can be about a second predefined length, and so on and so forth. Alternatively, the fibers 26 can have a uniform length in certain embodiments. It is appreciated that other sizing and/or density of the fibers can be used in conjunction with the present disclosure. An important aspect of the fibers is that the fibers can wick liquid to hot areas to dissipate heat via phase transition from liquid to gas.

Figure 4B:
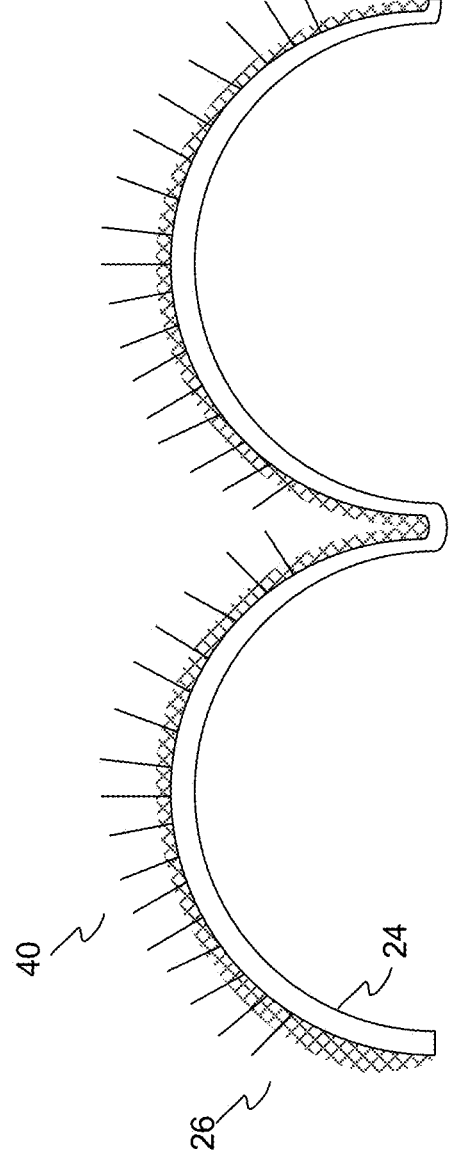
FIG. 4b illustrates a zoomed-in, cross-sectional view of a wall of a thermal runaway shield module of the present disclosure having bimodal carbon fibers.

FIG. 4b illustrates a zoomed-in view of an interior side of a wall of a thermal runaway shield module of the present disclosure having bimodal carbon fibers. In another embodiment, the carbon fibers 26 in the zoomed-in view 40 of the TRS module can comprise bimodal fibers. In such embodiment, the fibers 26 can have a first group of carbon fibers having a first predefined length from the wall 24 and a second group of carbon fibers having a second predefined length from the wall 24, where the second predefined length is longer then the first predefined length. The first group is denser and have smaller pore size than the second group. The second group can be longer and less dense than the first group. The various carbon fiber lengths provide for flexibility in the amount of wicking and the amount of aqueous solution or surfactant retention. The carbon fiber lengths and density of each group of fibers can be predefined to account for a predefined amount of energy dissipation and other design needs.

Figure 4C:
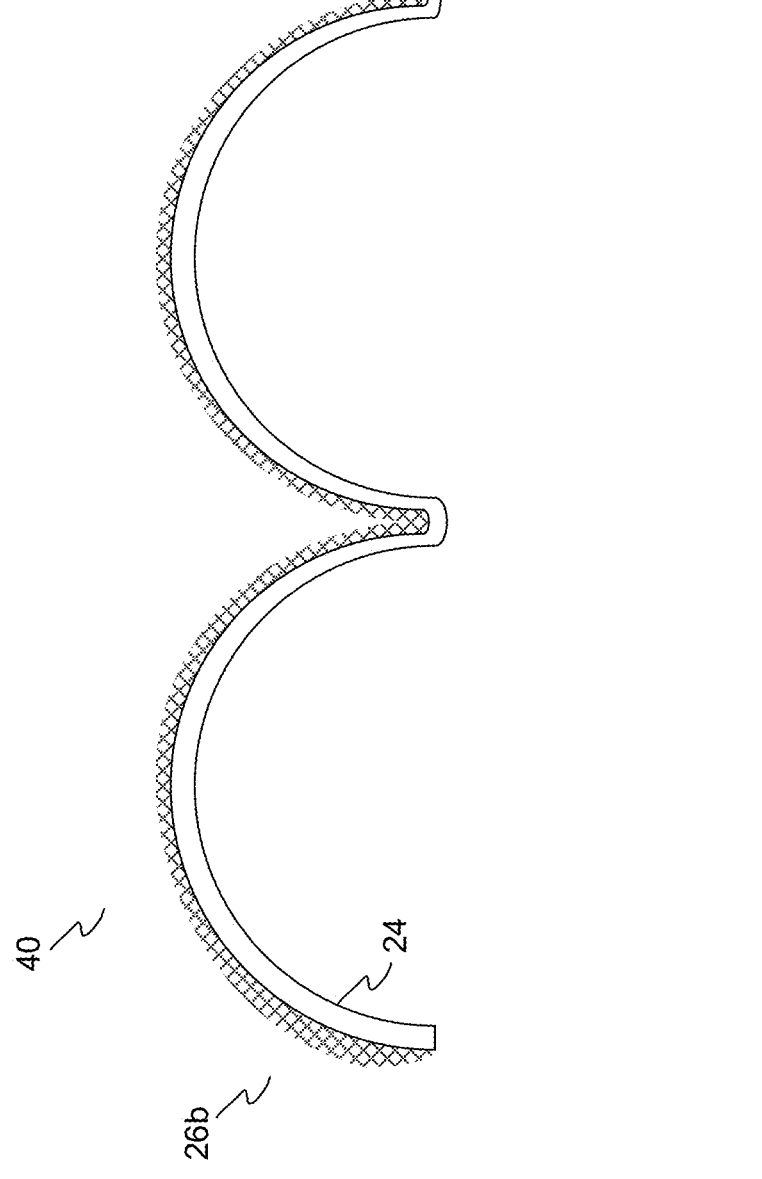
FIG. 4c illustrates a zoomed-in, cross-sectional view of a wall of a thermal runaway shield module of the present disclosure having a veil wick.

FIG. 4c illustrates a zoomed-in, cross-sectional view of a wall of a thermal runaway shield module of the present disclosure having a veil wick. In yet another embodiment, a veil 26b, shown in the zoomed-in view 40, can be used for wicking in the TRS module (instead of flocked carbon fibers or in combination with carbon fibers). The veil 26b can be disposed within an inner cavity of the TRS for wicking and as a thermal interface. The veil's 26b wicking performance can be comparable to a flocked carbon fiber. However, the veil 26b can have its fibers oriented along a horizontal plane of the veil (i.e., in a veil configuration). The veil 26b may be manufactured by woven or non-woven techniques that are well known in the art.

It can be appreciated that various veils can be used for a TRS of the present disclosure. The carbon veil described herein is only one such example of such veil and is in no way meant to limit the present disclosure. Furthermore, although the description herein describes a single carbon veil sheet within the TRS, it is no way meant to limit the present disclosure to a single carbon veil sheet since it is appreciated that multiple carbon veil sheets can be used in conjunction with the present disclosure. It can be further appreciated that the various layers in the TRS can be determined depending on a design for the TRS.

Figure 5:
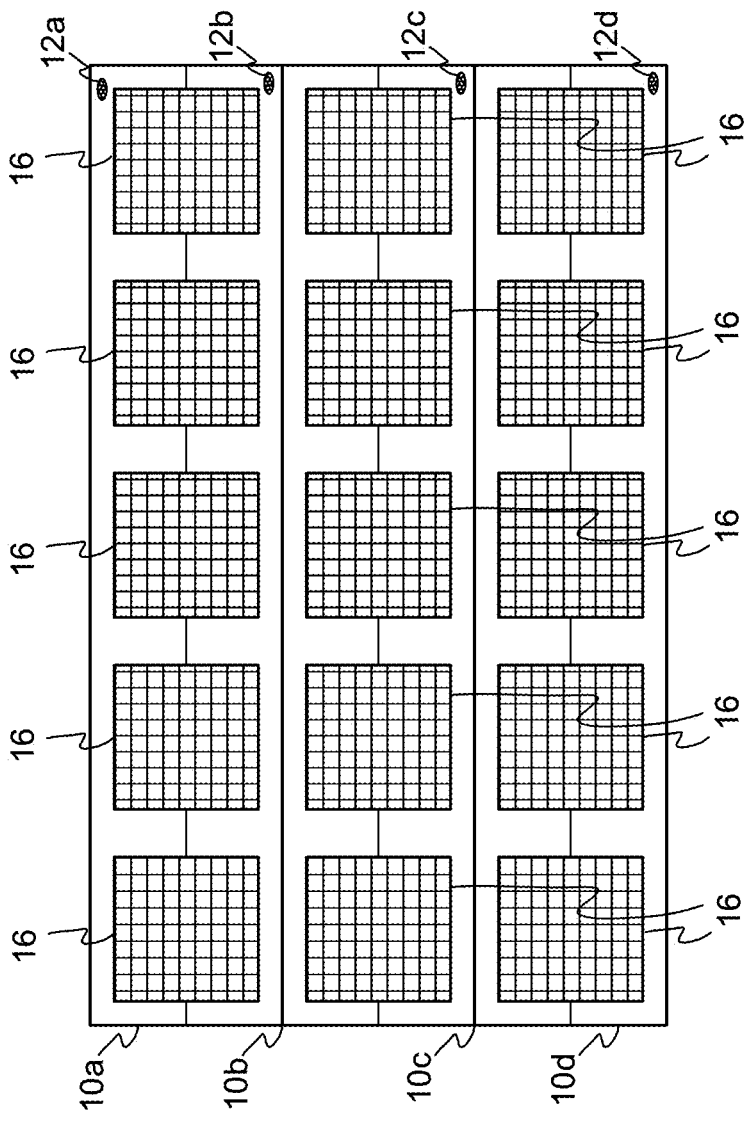
FIG. 5 illustrates an alternative form factor for a thermal runaway shield of the present disclosure.

FIG. 5 illustrates an alternative form factor for a thermal runaway shield of the present disclosure. As noted above, the thermal runaway shield can be molded to fit various prismatic ESD cells. For instance, an ESD cell that has a rectangular form factor can fit into a thermal runaway shield of the present disclosure. The thermal runaway shield is molded to provide for spacing for the rectangular ESD cells to fit between the exterior sides of the walls of the thermal runaway shield.

Figure 6:
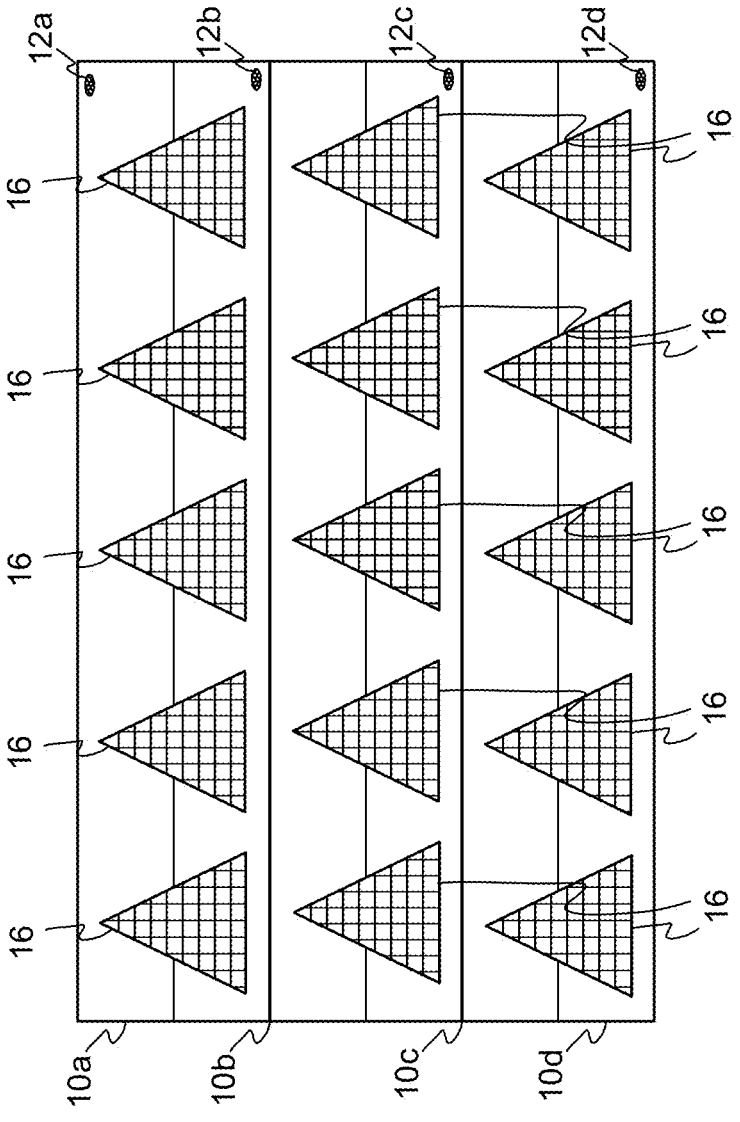
FIG. 6 illustrates yet another alternative form factor for a thermal runaway shield of the present disclosure.

FIG. 6 illustrates yet another alternative form factor for a thermal runaway shield of the present disclosure. In another example, an ESD cell that has a prismatic form factor with triangular ends, which can fit into a thermal runaway shield of the present disclosure. The thermal runaway shield is molded to provide for spacing that conforms to the prismatic ESD cells having triangular ends. The ESD cells can be disposed between the exterior sides of the walls (also referred to as the exterior walls) of adjacent thermal runaway shield modules. Various other shapes for the prismatic form factor can also be designed such that the thermal runaway shield can be molded to fit such shapes.

Figure 7:
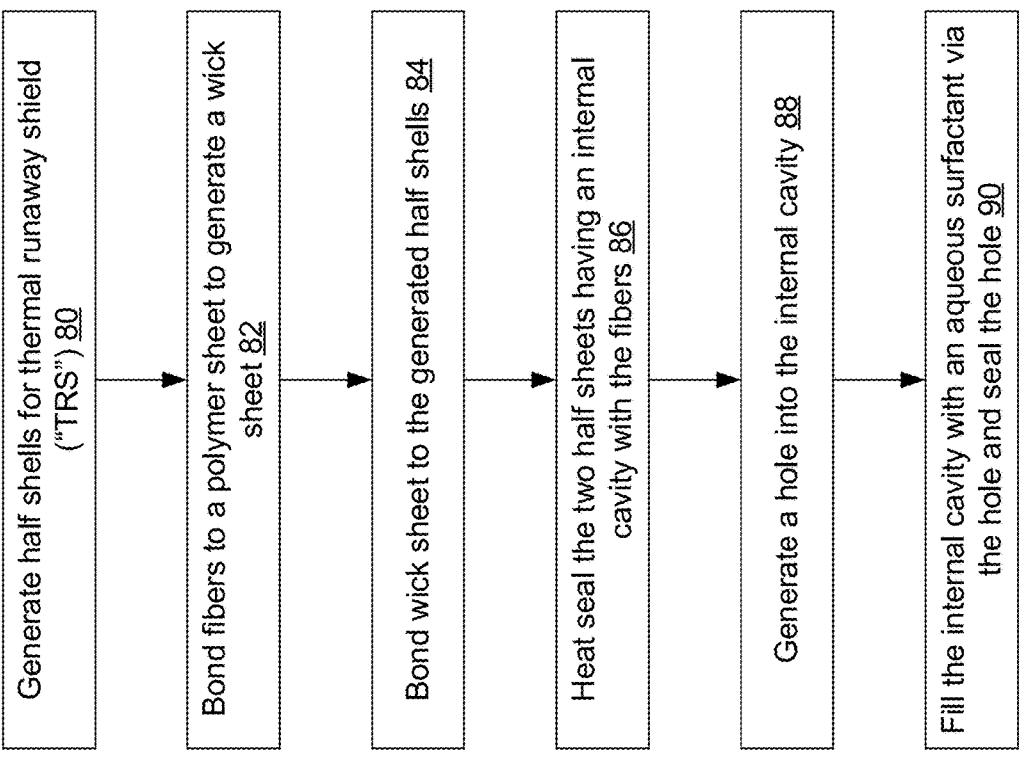
FIG. 7 illustrates a flow chart for manufacturing a thermal runaway shield module of the present disclosure.

FIG. 7 illustrates a fabrication sequence for manufacturing a thermal runaway shield module of the present disclosure. A thermal runaway shield can comprise a case having wicks inside the case. The case can be assembled by using two half shells and merging the two half shells to form the case. The two half shells can form the walls of the TRS, where each half shell has an interior side for the inner cavity and an exterior side.

In one method, a flocked polymer sheet can be installed inside each of half shells prior to assembly. In an alternative method, the carbon fibers can be directly flocked into each half shell prior to assembly. In an embodiment, multiple TRS modules can be stacked to form the thermal runaway shield. The thermal runaway shield can have multiple openings between the thermal runaway shield modules for placement of ESD cells within the openings.

Referring to FIG. 7, a fabrication sequence for the thermal runaway shield module can be the following. A polycarbonate sheet (e.g., of 0.030-inch thickness) can be vacuum molded to form half shells, step 80. It is appreciated that the casing of the TRS can also be made of various other substances, including various rigid and nonrigid substances, e.g., aluminum, other metallic materials, a plastic sheet (e.g., Mylar), PVC, PET, PE, PETG, graphite material, polymer material, carbon material, fabric material, and other rigid or nonrigid materials. The present example is not meant to limit the present disclosure in any way to a particular material for the casing.

Next, a Kapton sheet (or similar product having a predefined thickness, e.g., 0.05 millimeters) can be disposed over an area sufficient to cover an interior wall of each of the two half shells, exclusive of flat edge flanges, step 82. Carbon fibers (e.g., Grafil fibers of about 1 millimeter in length or other various lengths for a multi-modal configuration) are flocked onto a high-temperature epoxy (e.g., Cotronics Duralco 4525 of about 0.076 millimeters thick) that has been spread onto the Kapton sheet. Two pieces of the flocked Kapton sheet are cut to form the wick strips for installation into the half shells. The widths of the two pieces can be slightly less than the internal widths of the half shell cavities (e.g., where the internal width can be about 3 inches in some embodiments). Lengths of the two pieces allow for about 1 to 2 inches of overhang at each end of the Kapton strips after pressing into cavities of the half shells. In an example, the length of the shells can be about 16 inches for a 10-cell configuration for holding of 10 ESD cells.

The flocked sheets are bonded onto the half shells, step 84. In order to install the flocked Kapton sheets, a tool for bonding the wicked sheets into the half shell can consist of a predefined number of vertical blades on a rigid base. The blades are spaced to coincide with the valleys on either side of each half cylinder of the shell. The predefined number of vertical blades match the number of valleys in the shells. For instance, a shell that has 10 openings to contain 10 batteries can have 11 valleys in the shells. Thus, there are 11 vertical blades to match the number of valley. An adhesive can be disposed on one side of the flocked sheets to be coupled to the interior wall of the half shells using the tool to press down the flocked sheets onto the interior wall. Alternatively, or in conjunction, a bonding procedure can be employed in which an adhesive is applied to an inner surface of the half shell prior to inserting the flocked sheet.

It can be appreciated that other bonding tools and coupling methods can be used to bond the flocked sheets to the interior walls. The present example is not meant to be interpreted as limiting the present disclosure to such method or tool. Furthermore, it can be appreciated that a veil wick can also be used in a rigid TRS as described herein in conjunction with or alternatively to using flocked fibers. The veil can be held to an inner surface of a half shell by a pressure-sensitive adhesive ("PSA").

For instance, additional tooling can consist of upper and lower clamping plates to hold the wick in contact with the half shell as the epoxy cures. The lower plate can be one piece, while the upper plate is split into two equal parts to allow for securing the first half of the wick sheet before completing the placement of the remainder of the wick. A strip of wick is placed, flock side down, onto the blades of the bonding tooling with approximately equal amounts of overhang past the ends of the tooling. Starting at one end, the first valley of half shell is pressed down onto the first blade such that the wick is fully pressed into the valley. This procedure is repeated sequentially until half of the wick has been fully seated. This can require manually holding the parts in place on the blades. The first upper half plate can be fastened in place to secure that portion of wick which has so far been inserted. Wick insertion is continued until the wick has been pressed into the remaining valleys, and the second upper half plate is fastened and secured. The adhesive is then allowed to cure. The excess wick at the ends can be trimmed away. The bonding is repeated for the second half shell and wick strip.

In a manufacturing environment, it may be more efficient to use a blade assembly where the blades can be moved/locked independently, eliminating the need to manually hold the half shell on stationary blades until the upper plates have been positioned to hold the assembly together for adhesive cure. Furthermore, it is understood that there can be other methods for coupling carbon fibers to a shell.

After the adhesive has cured and excess wick at the ends has been trimmed away, the half shells with wicks can be heat sealed to form the thermal runaway shield module, step 86. Last, a small fill/vent hole (also referred to as an opening) can now be pierced, step 88, through the wall of the TRS module at a location(s) appropriate for the attitude in which the TRS module is to be used. The hole has two functions: (1) it allows the inner cavity of the TRS module to be filled by a predefined amount of an aqueous surfactant, step 90 (an optional step); and (2) it also allows internal pressure to be vented if a cell undergoes thermal runaway propagation. After filling the TRS module with surfactant, the fill/vent hole (otherwise referred to as an opening) can be sealed, step 90, in a manner that will prevent fluid leakage until such time that pressure venting occurs. For instance, a rubber plug (or other sealing method or device) can be used to seal the opening. It can be appreciated that various methods and apparatuses can be used to seal the opening. The use of a plug is only just one of these many methods that can be understood based on the present disclosure. The present disclosure is in no way meant to limit the sealing of an opening of a TRS to a plug.

The specific fabrication sequence and sizing of the components of the thermal runaway shield module are not meant to limit the present disclosure to that specific manufacturing process and sizing. It is understood that various alterations to the steps, various ordering of the steps, and/or various sizing of the thermal runaway shield module components can be appreciated based on the present disclosure; such variations are meant to be within the scope of the present disclosure.

Figure 8:
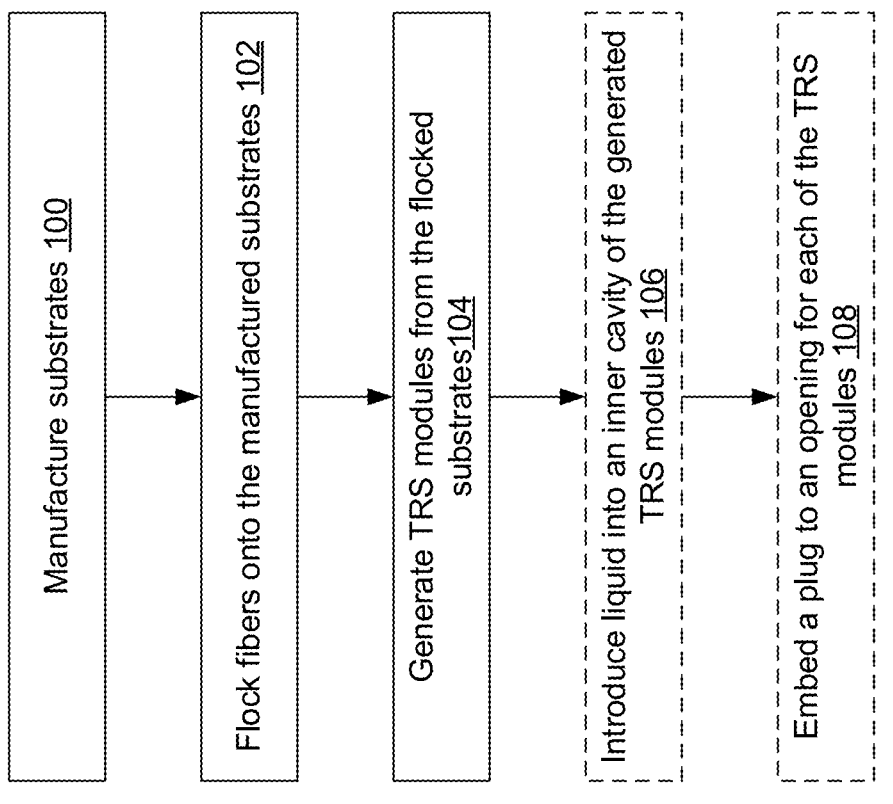
FIG. 8 illustrates a flow chart for an alternative embodiment of manufacturing a thermal runaway shield module of the present disclosure.

FIG. 8 illustrates yet another flow chart for manufacturing a thermal runaway shield module of the present disclosure. In order to generate the thermal runaway shield, substrates for the thermal runaway shield modules are manufactured, step 100. The manufactured substrates are flocked on one side with fibers, step 102. The flocked substrates are coupled together to generate the thermal runaway shield modules, step 104. Typically, two flocked substrates are coupled together with the flocked sides facing each other to form the inner cavity of a thermal runaway shield module. Multiple thermal runaway shield modules can be formed in such manner. Once coupled, the inner cavity of the thermal runaway shield modules can be introduced with liquid, step 106. The liquid can be used as an aqueous surfactant/solution to wet the fibers within the inner cavity. Lastly, a plug can be embedded into an opening to the inner cavity for each of the thermal runaway shield modules, step 108. Lastly, as noted before, thermal runaway shield modules can be stacked to form a thermal runaway shield. The thermal runaway shield has multiple openings between the thermal runaway shield modules for placement of ESD cells within the openings. It can be appreciated that step 106 for introducing liquid and step 108 for plugging an opening are optional steps depending on the design of a TRS module. Furthermore, it can be appreciated that steps 106 and 108 can be alternative steps, where the inner cavity may have liquid with no opening to plug or, alternatively, may have an opening with a plug without any liquid in the inner cavity.

Flexible Thermal Runaway Shield

Figure 9:
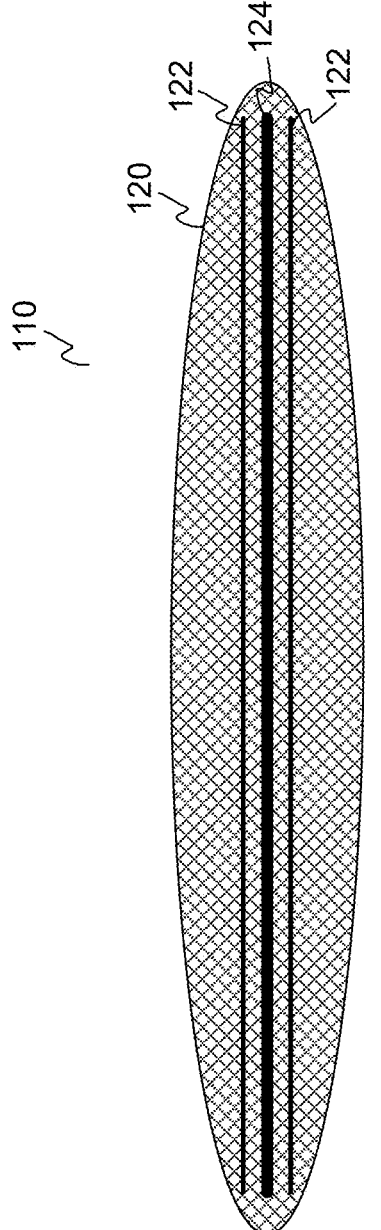
FIG. 9 illustrates a top view of a flexible thermal runaway shield of the present disclosure.
Figure 9:

FIG. 9 illustrates a top view of a flexible thermal runaway shield of the present disclosure. A TRS of the present disclosure can be flexible such that the TRS can be wrapped around one or more ESD cells or other devices for shielding. The TRS can have a more flexible shell to allow for such bending.

In an embodiment and referring to FIG. 9, a TRS 110 can comprise a flexible wrapper (also referred to as a barrier film) 120, heat spreaders 122, and a carbon veil 124. In the top view, the various layers of the TRS 110 can be seen when such top side of the flexible wrapper 120 has not been coupled together to form a sealed inner cavity. It is appreciated that this view is to aide in the understanding of the present disclosure is not meant to be limiting in any way.

The flexible wrapper 120 can be a combination of materials such that two sheets of the wrapper 120 can be coupled together to form an interior cavity to house the heat spreaders 122 and the carbon veil 124. When the two sheets of the wrapper 120 are sealed together via heat sealing (or other form of coupling, e.g., via an adhesive material), the interior cavity can be isolated from the exterior of the TRS since the wrapper 120 is impermeable to gas and liquid. Thereby, liquid can be disposed in the inner cavity for wicking without leaking out of the TRS 110.

The flexible wrapper 120 can comprise of multiple layers including a polyethylene terephthalate ("PET") layer for strength and durability of the wrapper, an aluminum layer adjacent to the PET layer for impermeability, another PET layer adjacent to the other side of the aluminum layer, and a polyethylene ("PE") layer for adhesion. The two layers of wrappers can have their respective PE layers facing each other and heat sealed such that the two layers of wrapper 120 are coupled together forming the inner cavity.

It can be appreciated that other flexible wrappers can be used for a TRS of the present disclosure. The flexible wrapper 120 described herein is only one such example of such wrapper and is in no way meant to limit the present disclosure. For instance, a flexible wrapper can comprise one or more of the following: polyvinyl chloride ("PVC") sheet, PET, PE, PETG, metallic material, graphite material, polymer material, carbon material, fabric material, and other materials for allowing flexibility of the TRS while providing liquid and gas impermeability.

The heat spreaders 122 are optional layers of the TRS 110 that can be sandwiched inside the inner cavity of the TRS 110. Typically, the heat spreaders 122 are laid in parallel sheets with the carbon veil 124. In some embodiments, only a single heat spreader is used on one side of the carbon veil 124. In further embodiments, the heat spreaders 122 may be omitted altogether. The heat spreaders 122 can be a material that can conduct heat such as graphite material, pyrolytic graphite sheet ("PGS"), foil, and/or other thermal interface materials.

It can be appreciated that other heat spreaders can be used for a TRS of the present disclosure. The heat spreaders 122 described herein are only one such example and is in no way meant to limit the present disclosure to such heat spreaders or to such particular configuration.

The carbon veil 124 can be disposed within the inner cavity of the TRS for wicking. The carbon veil's 124 wicking performance can be comparable to a flocked carbon fiber. However, the carbon veil 124 can have its fibers oriented along the horizontal plane of the veil. The carbon veil 124 can be manufactured by woven or non-woven techniques that are well known in the art. The carbon veil 124 is bendable such that when the TRS is bent, the carbon veil 124 can bend accordingly. Thus, the carbon veil 124 can be continuously connected within the TRS even when the TRS is bent.

It can be appreciated that various veils can be used for a TRS of the present disclosure. The carbon veil described herein is only one such example of such veil and is in no way meant to limit the present disclosure. Furthermore, although the description herein describes a single carbon veil sheet within the TRS, it is no way meant to limit the present disclosure to a single carbon veil sheet since it is appreciated that multiple carbon veil sheets can be used in conjunction with the present disclosure. Even more so, it is appreciated that flocked carbon fibers can also be used for a flexible TRS of the present disclosure. It can be further appreciated that the various layers in the TRS can be determined depending on a design for the TRS.

Figure 10:
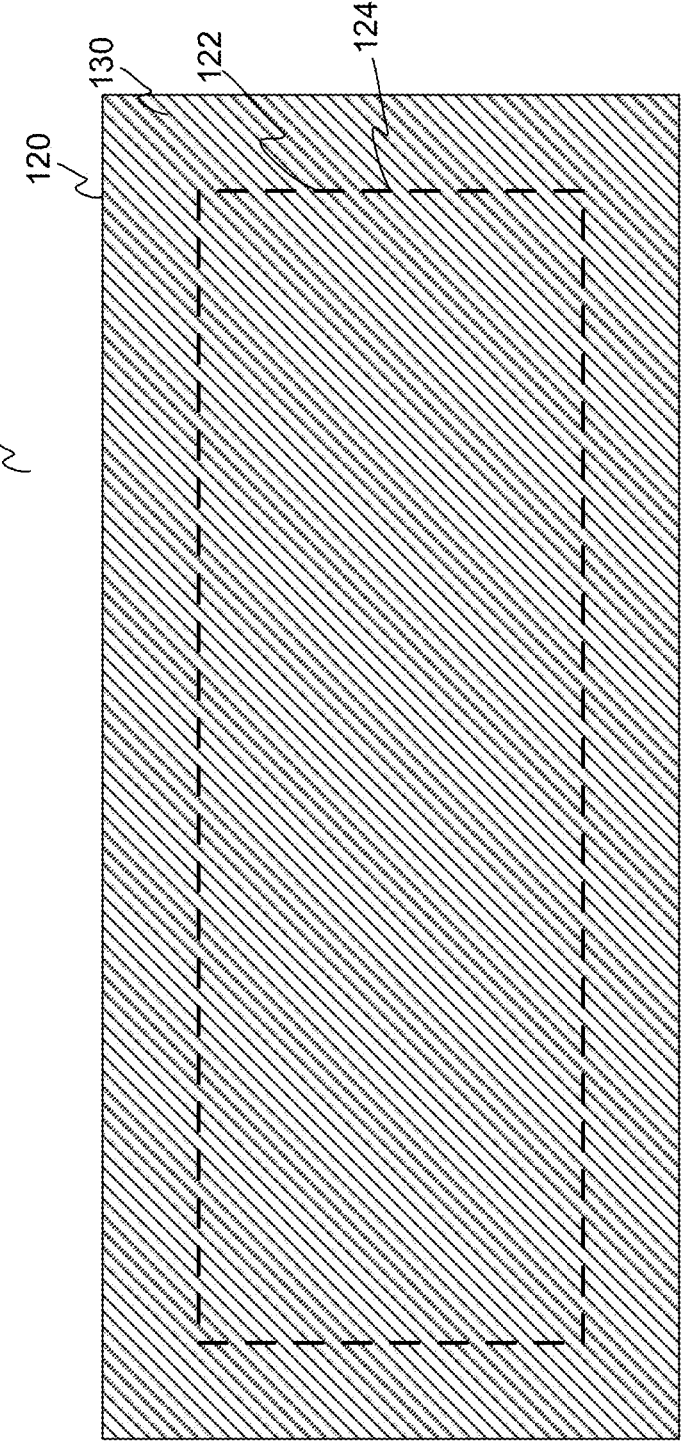
FIG. 10 illustrates a side view of a flexible thermal runaway shield of the present disclosure.

FIG. 10 illustrates a side view of a flexible thermal runaway shield of the present disclosure. In a side view of the TRS 110, a side wall 130 of the TRS 110. The side wall is the exterior wall of one of the layers of the flexible wrapper 120. Since the flexible wrapper 120 forms a sealed envelope around the heat spreaders 122 and the carbon veil 124, the heat spreaders 122 and the carbon veil 124 are not viewable from the exterior of the TRS 110. The exterior wall 130 of the TRS 110 can be bent to fit a particular application or shape; this can be appreciated based on the following configurations and descriptions.

Figure 11:
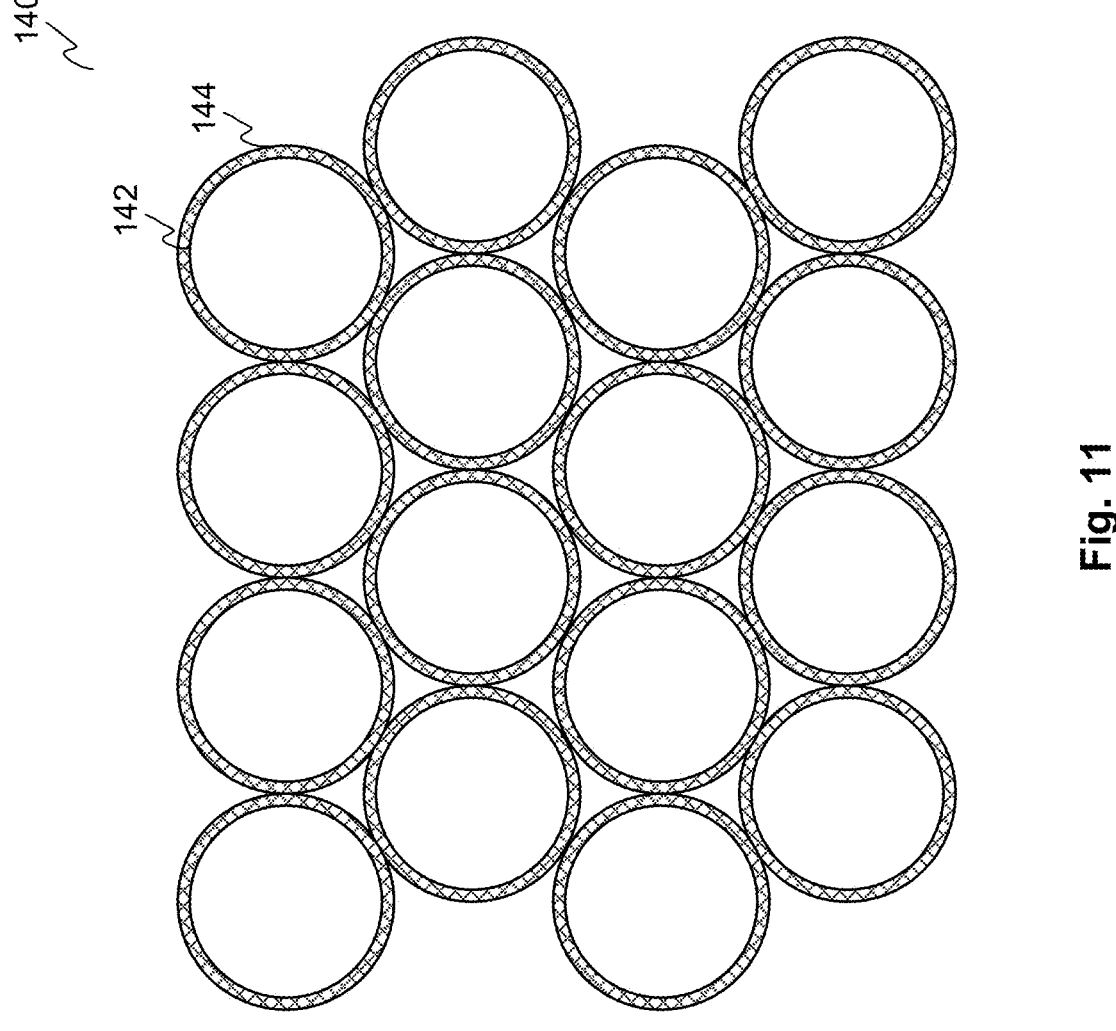
FIG. 11 illustrates a side view of flexible thermal runaway shields of the present disclosure.

FIG. 11 illustrates a side view of flexible thermal runaway shields of the present disclosure each surrounding a battery cell. A battery system 140 can comprise flexible thermal runaway shields 144 and ESD cells 142. The flexible thermal runaway shields 144 can be bent around the ESD cells 142 such that one of the exterior walls of each of the thermal runaway shields 144 is in contact with the ESD cells 142 (or otherwise thermally coupled to the ESD cells 142 to reduce and/or prevent thermal runaway from one of the cells 142 to adjacent cells).

It is appreciated that the flexible thermal runaway shields 144 do not necessarily have to be in direct contact with the cells 142 since folding of the thermal runaway shields 144 may not be ideal in that the thermal runaway shields 144 may not perfectly conform to the shape of the cells. Furthermore, it is appreciated that the shape of the cells can be non-cylindrically shaped. However, to aid in the understanding of the present disclosure, cylindrically shaped EDS cells are shown, but is in no way meant to limit the present disclosure for use with such cells. In fact, due to the flexibility of the flexible thermal runaway shield, the flexible TRS can be configured and bent to fit around any particularly shaped cell or for a particular application for that matter.

Figure 14:
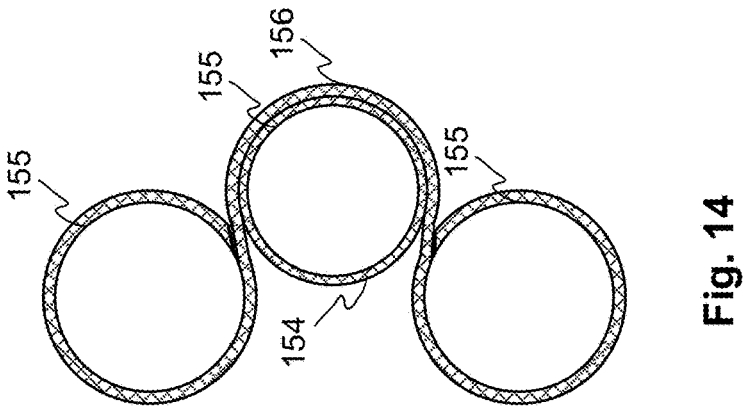
FIGS. 12-14 illustrate side views of various configurations for wrapping one or more flexible thermal runaway shields of the present disclosure around battery cells.
Figure 13:
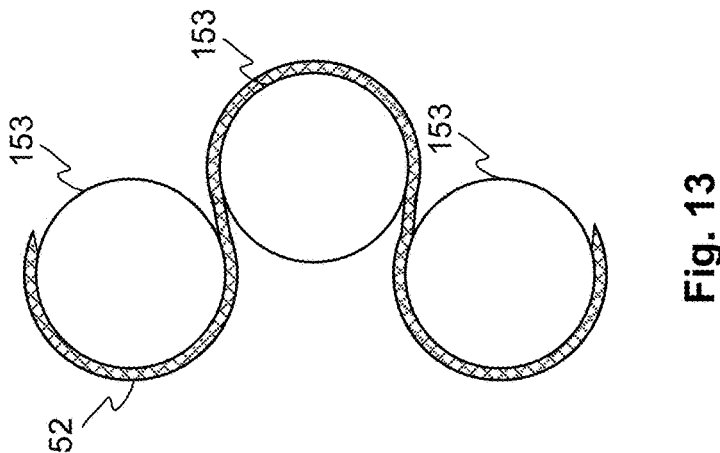
Figure 12:
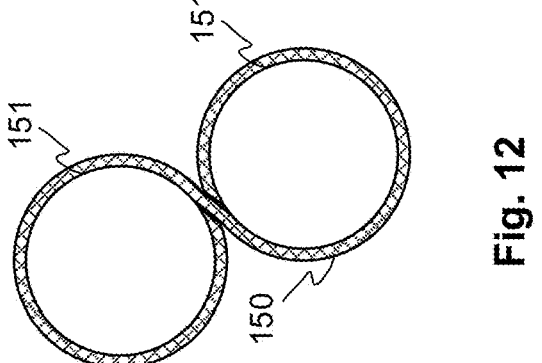

FIGS. 12-14 illustrate side views of various configurations for wrapping a flexible thermal runaway shield of the present disclosure around battery cells. Referring to FIG. 12, in a side view, a flexible thermal runaway shield 150 can be configured to be bent around two ESD cells 151. The ESD cells 151 are cylindrical in shape in this example. The flexible TRS 150 can be in a form factor of a sheet, such that the length of the flexible TRS 150 can be less than, equal to, or greater than the length of the ESD cells 151 and the height of the flexible TRS 150 is at least equal to the sum of the circumferences for the ESD cells 151. Thus, the flexible TRS 150 can contact the entire surface area of the ESD cells 151.

As stated above, it is not necessary for the flexible TRS 150 to be in direct contact with the entire surface area of the ESD cells 151. To aid in the understanding of the present disclosure, the flexible TRS 150 is configured to be in contact with the ESD cells, but this is merely an example of the many configurations that can be used in conjunction with the present disclosure. For instance, a gap can separate a part of the cells 151 and the flexible TRS 150. Also, a cell holder can be disposed around the cells 151 and the flexible TRS is disposed around those holders. Even more so, some layer or liquid can be applied between the cells 151 and the flexible TRS 150 to increase the thermal conductivity between the two. It can be appreciated that multiple other configurations for the flexible TRS can be gleamed based on the present disclosure.

Referring to FIG. 13, in a side view, a flexible thermal runaway shield 152 can be configured to be bent around three ESD cells 153. The ESD cells 153 are cylindrical in shape in this example. The flexible TRS 152 can be in a form factor of a sheet, such that the length of the flexible TRS can be less than, equal to, or greater than the length of the ESD cells 153 and the height of the flexible TRS 152 is less than the sum of the circumferences for the ESD cells 153. Thus, the flexible TRS 152 is capable of contacting a large portion of the surface area of the ESD cells 153.

Typically, ESD cells are grouped together in a number of cells greater than three. Thus, a grouping of ESD cells can be grouped together in an array of NxM cells. Due to the close packing of the grouping of cells, the flexible TRS for a group of three ESD cells can be used to be in contact to or near a surface area of a nearby group of cells that also have a flexible TRS directly in contact to or over those surfaces of the nearby group. Thus, for the top one of the cells 153, an adjacent flexible TRS of a nearby group of cells can be in contact with the exposed surfaces of the cells 153. In this manner, the cells 153 may have at least two different flexible TRSs available to absorb and otherwise redirect any thermal runaway.

Similarly to aid in the understanding of the present disclosure, the flexible TRS 152 is configured to be in contact with the ESD cells, but this is merely an example of the many configurations that can be used in conjunction with the present disclosure. For instance, a gap can separate a part of the cells 153 and the flexible TRS 152. Also, a cell holder (not shown) can be disposed around the cells 153 and the flexible TRS 152 can be disposed around those holders. Even more so, some layer or liquid can be applied between the cells 153 and the flexible TRS 152 to increase the thermal conductivity between the two. It can be appreciated that multiple other configurations for the flexible TRS can be gleamed based on the present disclosure.

Referring to FIG. 14, in a side view, flexible thermal runaway shields 154 and 156 can be configured in combination to be bent around three ESD cells 155. The ESD cells 155 are cylindrical in shape in this example. The flexible TRS s 154 and 156 can each be in a form factor of a sheet, but can vary in length and/or height from each other.

For instance, the length of the flexible TRS can be less than, equal to, or greater than the length of the ESD cells 155 and the height of the flexible TRS 154 is at least equal to a circumference of one of the ESD cells 155. Thus, the flexible TRS 154 can contact the entire surface area of one of the ESD cells 155. The length of the flexible TRS 156 approximates the length of the ESD cells 155 and the height of the flexible TRS 156 (as seen in the side view) is less than the sum of the circumferences of the three ESD cells 155. The configuration of the flexible TRS 154 and 156 allow for a double wrapping over a certain portion of the middle ESD cell 155 and a single wrapping of the other two ESD cells 155.

Similarly to aid in the understanding of the present disclosure, the flexible TRSs 154 and 156 are configured to be in contact with the ESD cells or each other, but this is merely an example of the many configurations that can be used in conjunction with the present disclosure. For instance, a gap can separate a part of the cells 155 and one of the flexible TRSs 154 and 156. Also, a cell holder (not shown) can be disposed around the cells 155 and the flexible TRSs 154 and 156. Even more so, some layer or liquid can be applied between the cells 155 and the flexible TRSs 154 and 156 to increase the thermal conductivity. It can be appreciated that multiple other configurations for the flexible TRS can be gleamed based on the present disclosure.

Although in FIGS. 12-14 there are two to three cells shown, it is understood that various wrapping schemes can be used in conjunction with present disclosure due to the versatility of having flexible TRSs. The configurations shown in FIGS. 12-14 are mere examples of the many different configurations that can be used in conjunction with the present disclosure and are not meant to be limiting in any manner.

Figure 15:
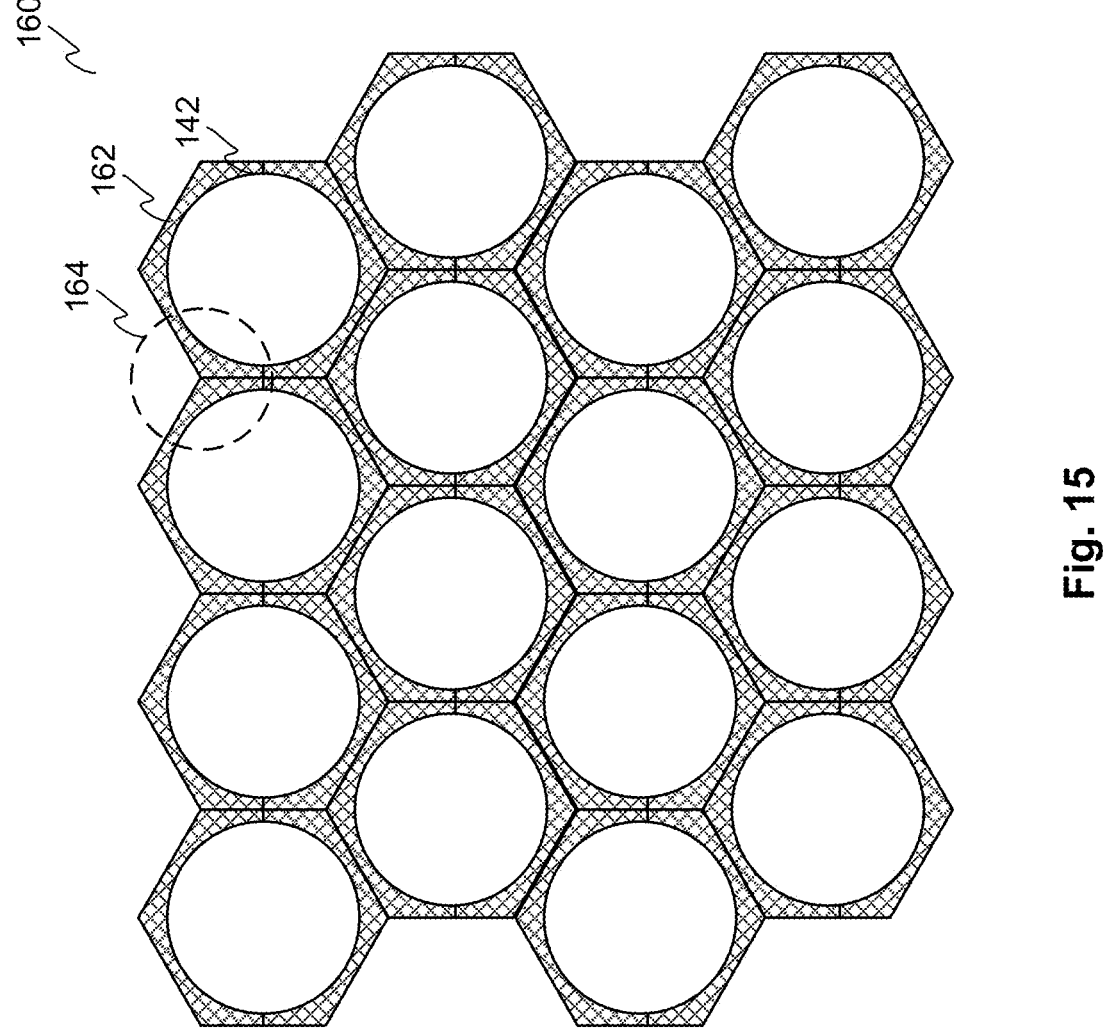
FIG. 15 illustrates a side view of a hexagonal wrapping configuration for wrapping flexible thermal runaway shields of the present disclosure around battery cells.

FIG. 15 illustrates a side view of a hexagonal wrapping configuration for wrapping flexible thermal runaway shields around battery cells. In such configuration, flexible TRSs 160 are shaped around cells 142 in a hexagonal folded shape. The flexible TRSs 160 can be in contact with the surface area of the cells 142. Each of the flexible TRSs 160 can be folded to cover an upper portion or lower portion of a row of cells 142. Additional flexible TRSs can also be used along a roll such that multiple flexible TRSs span across an upper portion or lower portion of a row of cells 142.

It can be illustrative to view the flexible TRS 162 which spans across the upper portion of the upper most top row of cells 142. Thus, the flexible TRS 162 is cinched in three areas to fit within the spaces between any two cells. For instance, zoomed-in view 164 can illustrate such cinching.

Figure 16:
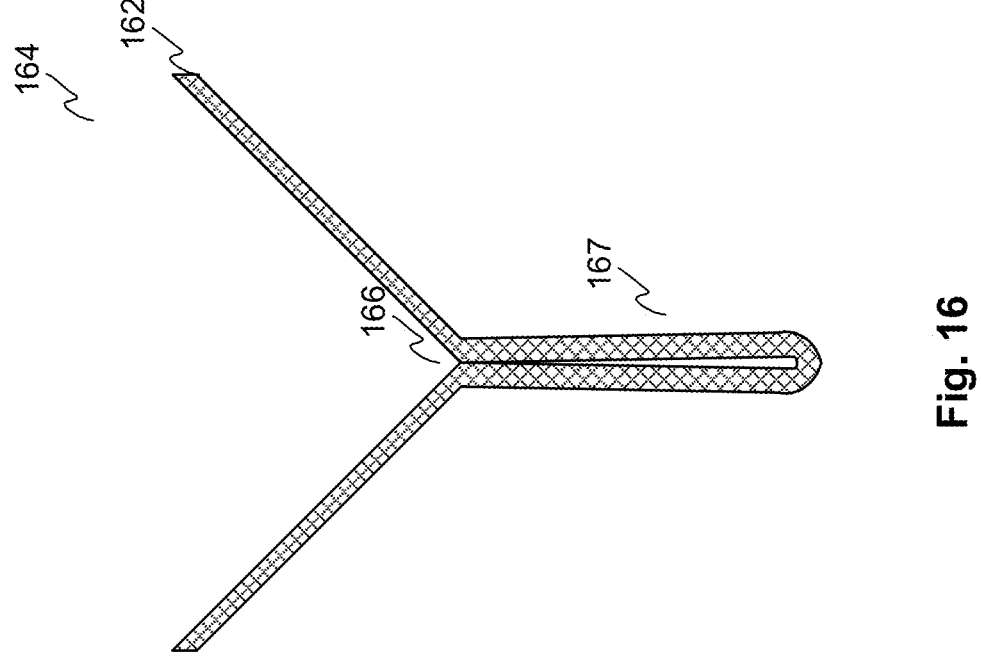
FIG. 16 illustrates a zoomed-in view of a flexible thermal runaway shield of the present disclosure that has been folded to correspond to a hexagonal wrapping configuration.

FIG. 16 illustrates a zoomed-in view of a flexible thermal runaway shield of the present disclosure that has been folded to correspond to a hexagonal wrapping configuration. In the zoomed-in view 164, the flexible TRS 162 is folded such that a portion 167 overlaps with itself. The overlapping portion can be coupled to each other to hold its form. In an embodiment, a spot weld can be performed at a location 166 near the end of the overlapping portion to keep the overlapping portion bent. In another embodiment, glue can be disposed between the two overlapping pieces of the TRS 162 to keep the TRS 162 from unraveling.

Figure 17:
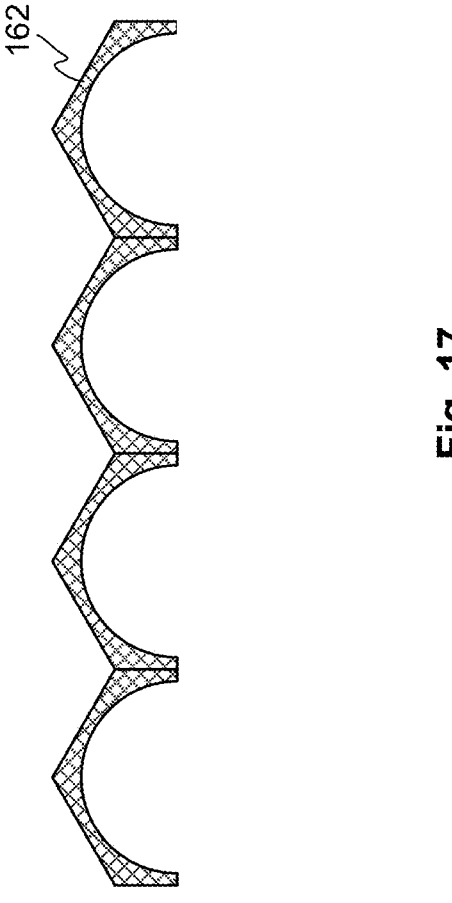
FIG. 17 illustrates a hexagonal wrapping configuration for a flexible thermal runaway shield of the present disclosure.

FIG. 17 illustrates a flexible thermal runaway shield using a hexagonal wrapping configuration. A result of such configuration for the single flexible TRS 162 has four hollow openings to allow for securing an upper half portion of an ESD cell or holder.

Figure 18:
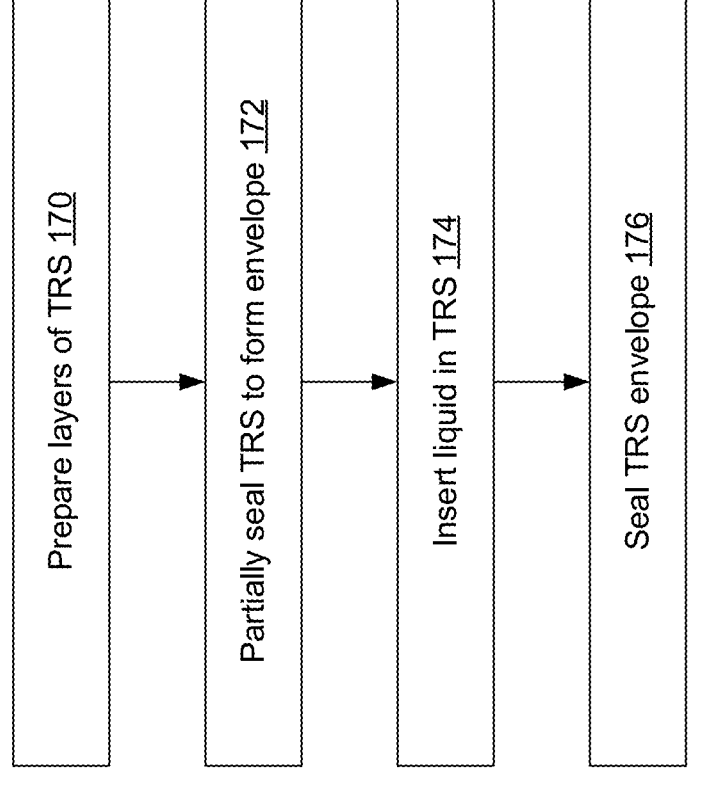
FIG. 18 illustrates a flow chart for manufacturing a flexible thermal runaway shield of the present disclosure.

FIG. 18 illustrates a flow chart for manufacturing a flexible thermal runaway shield. In manufacturing a flexible TRS, the various layers of the flexible TRS can be prepared and cut to size, step 170. For instance, the heat spreaders and the carbon veil are smaller than the flexible wrapper to allow for coupling of the two layers of the wrapper to form the inner cavity having the heat spreaders and the carbon veil.

In terms of ordering of the layers, the layering can be a first layer of the flexible wrapper, next a first heat spreader is placed adjacent to the first layer, a carbon veil is disposed adjacent to the first heat spreader, a second heat spreader is disposed adjacent to the other side of the carbon veil, and a second layer of the flexible wrapper is adjacent to the other side of the second heat spreader.

Three sides of the flexible wrapper can be heat sealed to partially seal the TRS to form an envelope for holding the heat spreaders and the carbon veil, step 172. Next a liquid can be disposed in the inner cavity of the TRS for wicking by the carbon veil, step 174. Lastly, the TRS envelope can be sealed 176 on its remaining side so that inner cavity is impermeable to gas and liquid for holding of the liquid within the inner cavity.

In other embodiments, the manufacturing process can be adjusted based on the configuration of the TRS. For instance, in some embodiments the heat spreaders are not used, so that the only layer between the flexible wrapper is the carbon veil. Thus, the manufacturing process can be adjusted accordingly. Furthermore, liquid may not be required in the inner cavity of the flexible TRS. Therefore, after the preparation of the layers step 170, the entire envelop can be sealed. Even more so, the flexible wrapper can be a single sheet that has been folded in half to provide a first layer and a second layer for the TRS. A person having ordinary skill in the art that the manufacturing process can be adjusted to fit various configuration of the flexible TRS.

Figure 19:
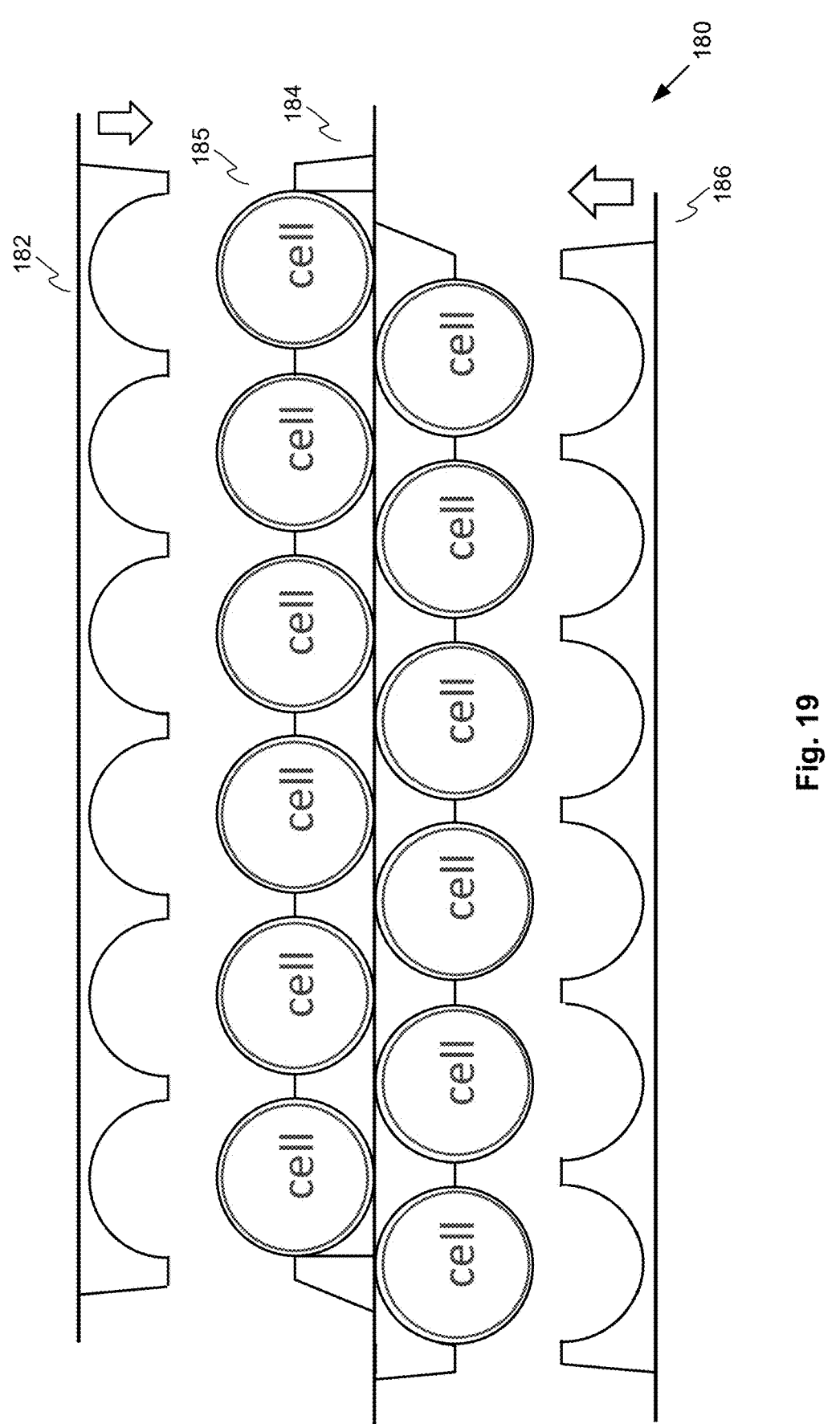
FIG. 19 illustrates a flexible thermal runaway shield module for storing a plurality of energy storage device cells.

FIG. 19 illustrates another embodiment of a thermal runaway shield module for storing a plurality of energy storage device cells. The TRS module 180 includes front views of a half wall 182, an interstitial wall 184, and a half wall 186. The walls of the thermal runaway shield module fit together and form a plurality of openings for placement of energy storage device cells 185. Although the TRS module 180 shows the interstitial wall 184, alternative embodiments may arrange the ESD cells 185 in a different configuration to exclude the interstitial wall 184 and include the two half walls 182, 186. Moreover, the TRS module 180 is shown to fit six energy storage device cells but could made to fit different number of cells. Similarly, FIG. 19 shows two layers of cells, but more units could be used to enclose more layer of cells. In an example embodiment, the TRS module 180 is formed from vacuum molded polycarbonate sheet similar to the fabrication sequence described in FIG. 7. The TRS module 180 is considered rigid or semi-rigid that affords the TRS module 180 itself to position the ESD cells in their respective locations.

Figures 20A, 20B, 20C, 20D:
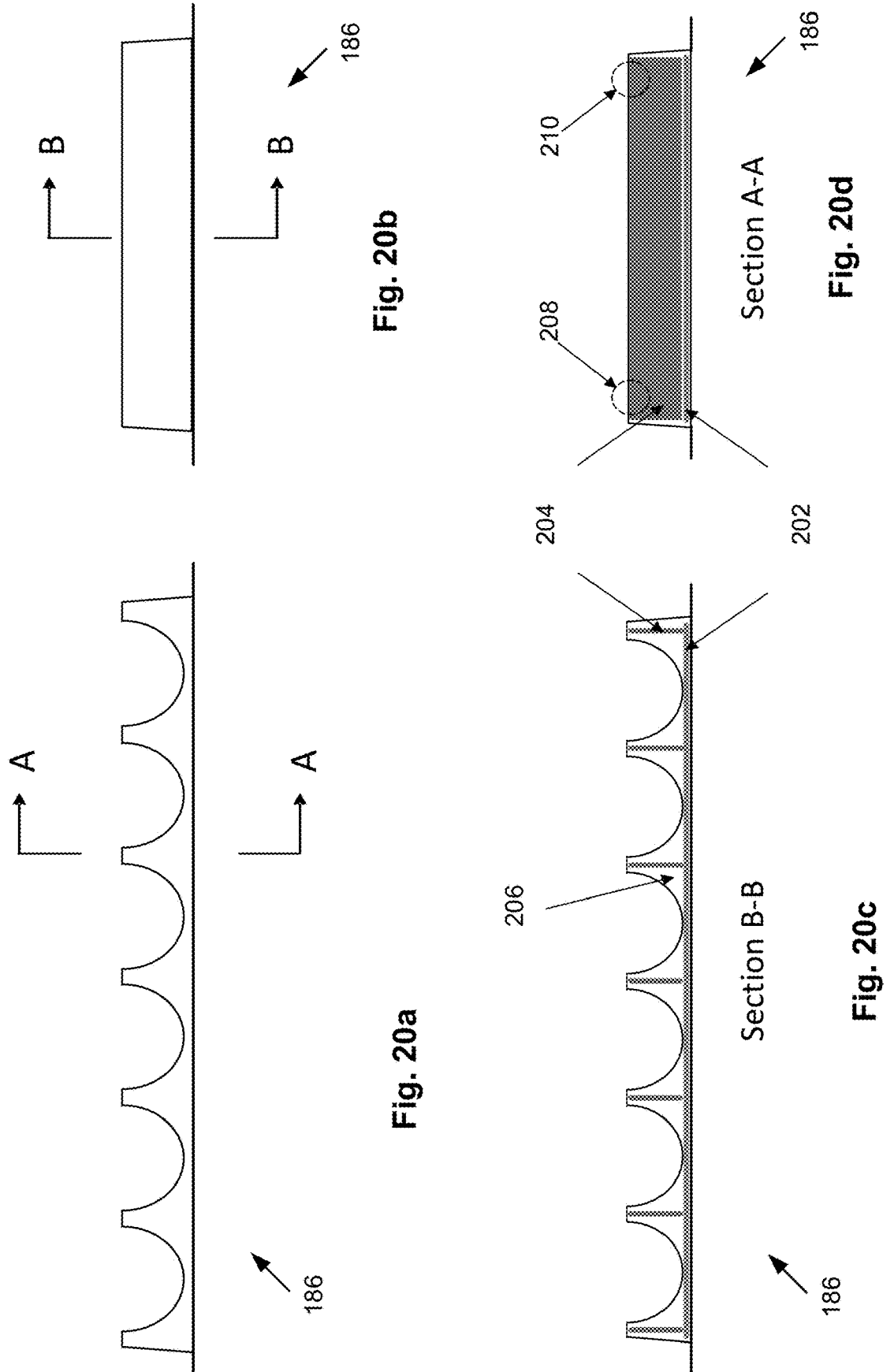
FIGS. 20a-20d illustrates front and side views of the half wall for the thermal runaway shield module and cross-sectional front and side views of the half wall.

FIG. 20a illustrates the front view of half wall 186 for a TRS module with a cross-section A-A. FIG. 20b illustrates a right-side view of the half wall 186 for a TRS module with a cross-section B-B. FIG. 20c illustrates the cross-section B-B of the right-side view of the half wall 186. FIG. 20d illustrates the cross-section A-A of the right-side view of half wall 186. Referring to FIG. 20c, the cross-section at B-B illustrates a cross-section view of the front view of the half wall 186. The cross-section B-B illustrates a flexible thermal runaway shield 202, a plurality of phenolic laminate inserts 204 or other heat resistant material, and phase change material 206 fills the cavity. The flexible TRS 202 extends along the length of the half wall 184. The flexible TRS 202 dissipates heat and blocks excessive heat transmission in the vertical direction. The phenolic insert 204 blocks excessive heat transmission in the horizontal direction. The phenolic insert 204 affords extra sidewall support for the ESD cells 185. In alternative embodiments, the phenolic insert 204 is shaped to substantially fill a vertical cavity of the half wall

186. Referring to FIG. 20*d*, the cross-section slice at A-A illustrates the phenolic insert 204 laminate bonded to an inside surface 208 and an inside surface 210 of the half wall 186. The internal voids or cavities of the half wall 186 affords inclusion of phase change material to moderate cell temperatures during charge and discharge of the ESD cells 185.

FIG. 21*a* illustrates the front view of the interstitial wall 184 for a TRS module with a cross-section slice C-C. FIG. 21*b* illustrates a right-side view of the interstitial wall 184 for a TRS module with a cross-section slice D-D. FIG. 21*c* illustrates the cross-section D-D of the right-side view of the interstitial wall 184. FIG. 21*d* illustrates the cross-section slice C-C of the front view of interstitial wall 184. Referring to FIG. 21*c*, the cross-section slice at D-D illustrates a flexible thermal runaway shield 202, a plurality of phenolic laminate inserts 204 or other heat resistant material, and phase change material 206 fills surrounding cavity. The flexible TRS 202 dissipates heat and blocks excessive heat transmission in the vertical direction. The phenolic insert 204 blocks excessive heat transmission in the horizontal direction. The phenolic insert 204 affords extra sidewall support for the ESD cells 185. In alternative embodiments, the phenolic insert 204 is shaped to substantially fill a vertical cavity of the interstitial wall 184. Referring to FIG. 21*d*, the cross-section slice at C-C illustrates the phenolic insert 204 laminate bonded to an inside surface 212 and an inside surface 214 of the interstitial wall 184. The internal voids or cavities of the interstitial wall 184 affords inclusion of phase change material to moderate cell temperatures during charge and discharge of the ESC cells 185.

While the present disclosure has been described with reference to certain preferred embodiments or methods, it is to be understood that the present disclosure is not limited to such specific embodiments or methods. Rather, it is the inventor's contention that the disclosure be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A thermal runaway shield ("TRS") module, comprising:

a first wall having an exterior side and an interior side operative to provide a plurality of first vertical cavities within the first wall;

a second wall having an exterior side and an interior side operatively to provide a plurality of second vertical cavities within the second wall; and phenolic laminate inserts disposed in the plurality of first vertical cavities and the second vertical cavities of the first wall and the second wall, respectively wherein the first wall and the second wall are coupled; and wherein at least one of the exterior side of the first wall and the exterior side of the second wall has a shape for conforming to a shape of at least one energy storage device cell.

2. The TRS module of claim 1, wherein the phenolic laminate inserts in the plurality of first vertical cavities are each attached to the interior side of the first wall and the phenolic laminate inserts in the plurality of second vertical cavities are each attached to the interior side of the second wall.

3. The TRS module of claim 2, wherein the phenolic laminate inserts in the plurality of first vertical cavities are each bonded to the interior side of the first wall and the phenolic laminate inserts in the plurality of second vertical cavities are each bonded to the interior side of the second wall.

4. The TRS module of claim 2, wherein the phenolic laminate inserts in the plurality of first vertical cavities substantially fills each of the plurality of first vertical cavities; and the phenolic laminate inserts in the plurality of second vertical cavities substantially fills each of the plurality of second vertical cavities.

5. The TRS module of claim 1, wherein the first wall includes a first horizontal cavity configured to receive a first flexible TRS substantially sized as the first horizontal cavity and the second wall includes a second horizontal cavity configured to receive a second flexible TRS substantially sized as the second horizontal cavity.

6. The TRS module of claim 5, wherein phase change material fills unoccupied cavities of the first wall; and phase change material fills unoccupied cavities of the second wall.

7. The TRS module of claim 1, wherein the first wall and the second wall comprise one or more rigid materials.

8. The TRS module of claim 1, wherein the first wall and the second wall comprise one or more non-rigid materials.

9. The TRS module of claim 1, wherein phase change material fills unoccupied cavities of the first wall; and phase change material fills unoccupied cavities of the second wall.

10. The TRS module of claim 1, wherein the at least one of the exterior side of the first wall and the exterior side of the second wall has cylindrical indentations.

11. A thermal runaway shield ("TRS"), comprising:

at least one TRS module, wherein the at least one TRS module comprises:

a first wall having an exterior side and an interior side configured to provide at least one first vertical cavity within the first wall;

a second wall having an exterior side and an interior side configured to provide at least one second vertical cavity within the second wall; and phenolic laminate inserts disposed in the at least one first vertical cavity of the first wall and the at least one second vertical cavity of the second wall, wherein the first wall and the second wall are coupled; and wherein at least one of the exterior side of the first wall and the exterior side of the second wall has a shape for conforming to a shape of at least one energy storage device cell.

12. The TRS of claim 11, wherein the phenolic laminate inserts in the at least one first vertical cavity is attached to the interior side of the first wall and the phenolic laminate inserts in the at least one second vertical cavity is attached to the interior side of the second wall.

13. The TRS of claim 12, wherein the phenolic laminate inserts in the at least one first vertical cavity is bonded to the interior side of the first wall and the phenolic laminate inserts in the at least one second vertical cavity is bonded to the interior side of the second wall.

14. The TRS of claim 12, wherein the phenolic laminate inserts in the at least one first vertical cavity substantially fills the at least one first vertical cavity; and the phenolic laminate inserts in the at least one second vertical cavity substantially fills the at least one second vertical cavity.

15. The TRS of claim 11, wherein the first wall includes a first horizontal cavity configured to receive a first flexible TRS substantially sized as the first horizontal cavity and the second wall includes a second horizontal cavity configured to receive a second flexible TRS substantially sized as the second horizontal cavity.

16. The TRS of claim 15, wherein aqueous surfactant is disposed in unoccupied cavities of the first wall; and aqueous surfactant is disposed in unoccupied cavities of the second wall.

17. The TRS of claim 11, wherein the first wall and the second wall comprise one or more rigid materials.

18. The TRS of claim 11, wherein the first wall and the second wall comprise one or more non-rigid materials.

19. The TRS of claim 11, wherein the at least one of the exterior side of the first wall and the exterior side of the second wall has cylindrical indentations.

20. A method for manufacturing a thermal runaway shield ("TRS") module, comprising:

generating outside unit walls having a plurality of first vertical cavities within the outside unit walls;

generating interstitial unit walls having a plurality of second vertical cavities within the interstitial unit walls;

inserting phenolic laminate slabs into the plurality of first vertical cavities;

inserting phenolic laminate slabs into the plurality of second vertical cavities; and coupling the outside unit walls and the interstitial unit walls together to form a TRS module configured to hold a plurality battery cells.

21. The method of claim 20 further comprising the steps of:

generating another outside unit walls having a plurality of third vertical cavities;

inserting phenolic laminate slabs into the plurality of third vertical cavities; and coupling the another outside unit walls and the interstitial unit walls together to form a combined TRS module configured to hold a plurality battery cells.

22. The method of claim 20 further comprising the step of filling an aqueous surfactant into the vertical cavities.

23. The method of claim 20 further comprising the step of bonding phenolic laminate slabs into the plurality of vertical cavities.

* * * * *